(12) United States Patent
Miyazawa et al.

(10) Patent No.: US 7,338,175 B2
(45) Date of Patent: Mar. 4, 2008

(54) FRONT PROJECTION TYPE MULTI-PROJECTION DISPLAY

(75) Inventors: Yasunaga Miyazawa, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 10/998,225

(22) Filed: Nov. 29, 2004

(65) Prior Publication Data

US 2005/0117126 A1 Jun. 2, 2005

(30) Foreign Application Priority Data

Dec. 1, 2003 (JP) .............................. 2003-401527

(51) Int. Cl.
*G03B 21/14* (2006.01)
(52) U.S. Cl. ......................... 353/94; 353/69; 353/101
(58) Field of Classification Search ................. 353/94, 353/69, 70, 133, 13, 85, 101; 348/745
See application file for complete search history.

(56) References Cited

U.S. PATENT DOCUMENTS

| | | | |
|---|---|---|---|
| 5,589,985 A | 12/1996 | Heller | |
| 5,956,000 A | 9/1999 | Kreitman et al. | |
| 6,050,690 A * | 4/2000 | Shaffer et al. | 353/122 |
| 6,254,239 B1 * | 7/2001 | Hibner et al. | 353/94 |
| 6,558,006 B2 * | 5/2003 | Ioka | 353/94 |
| 6,695,451 B1 | 2/2004 | Yamasaki et al. | |
| 6,927,784 B2 * | 8/2005 | Matsuda et al. | 345/690 |
| 6,990,234 B2 * | 1/2006 | Kanai | 382/167 |
| 2002/0024640 A1 * | 2/2002 | Ioka | 353/94 |
| 2003/0058416 A1 * | 3/2003 | Safran et al. | 353/94 |
| 2003/0214633 A1 * | 11/2003 | Roddy et al. | 353/31 |
| 2004/0041985 A1 * | 3/2004 | Kimura et al. | 353/70 |
| 2004/0125344 A1 * | 7/2004 | Matsui | 353/94 |
| 2004/0184011 A1 * | 9/2004 | Raskar et al. | 353/94 |
| 2004/0227908 A1 * | 11/2004 | Wada et al. | 353/94 |
| 2005/0088629 A1 | 4/2005 | Greenberg | |
| 2005/0146644 A1 | 7/2005 | Miyazawa et al. | |

FOREIGN PATENT DOCUMENTS

| | | |
|---|---|---|
| JP | 06-123868 | 5/1994 |
| JP | A-06-178327 | 6/1994 |
| JP | A-08-082854 | 3/1996 |
| JP | A-08-094974 | 4/1996 |
| JP | 09-200662 | 7/1997 |
| JP | A-09-211386 | 8/1997 |
| JP | A-09-326981 | 12/1997 |
| JP | 2000-350230 | 12/2000 |
| JP | 2001-147667 | 5/2001 |
| JP | 2001-166377 | 6/2001 |

(Continued)

*Primary Examiner*—William C. Dowling
(74) *Attorney, Agent, or Firm*—Oliff & Berridge PLC

(57) ABSTRACT

A front projection type multi-projection display includes a plurality of projector units to modulate and project light from a light source based on image information, an image-capturing device disposed in a housing to capture predetermined regions of the projection images projected onto the screen, a unit image information generating unit to generate image information to be input to each of the plurality of projector units, and a unit image information correcting unit to correct the unit image information based on a result captured by the image-capturing device. Therefore, it is possible to perform the adjustment process and to further reduce the adjustment time.

17 Claims, 28 Drawing Sheets

FOREIGN PATENT DOCUMENTS

| | | |
|---|---|---|
| JP | A-2001-251651 | 9/2001 |
| JP | A-2001-339672 | 12/2001 |
| WO | WO 99/14716 | 3/1999 |
| WO | WO-99/31877 A1 | 6/1999 |
| WO | WO 00/18139 | 3/2000 |

\* cited by examiner

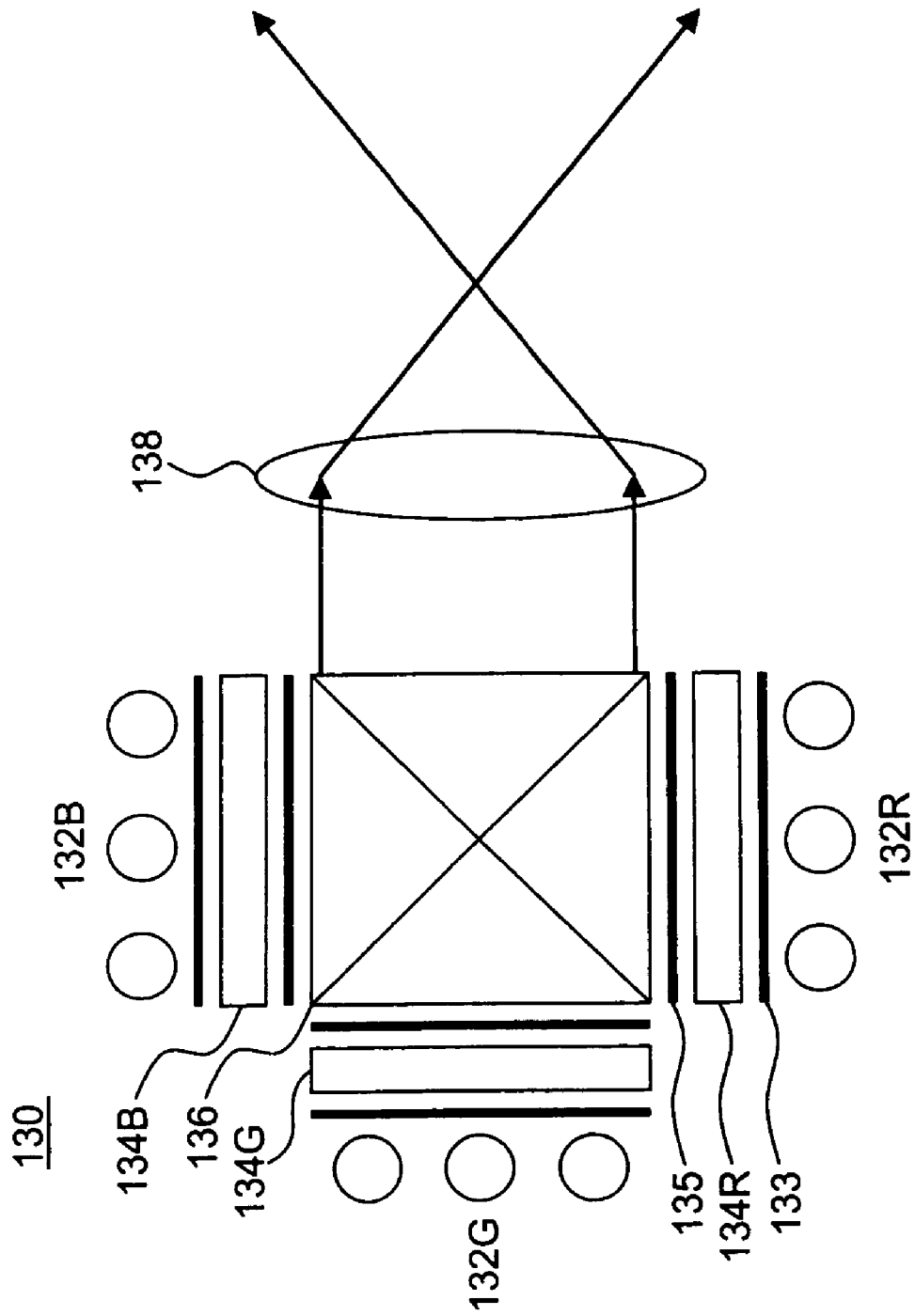

FIG. 7
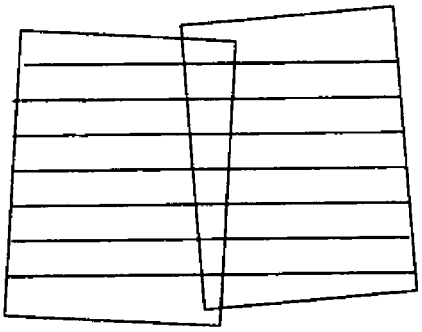
(BEFORE CORRECTING)
⇧
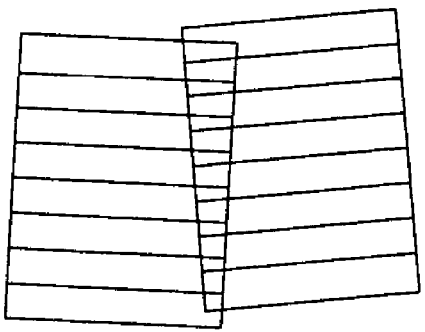
(AFTER CORRECTING)
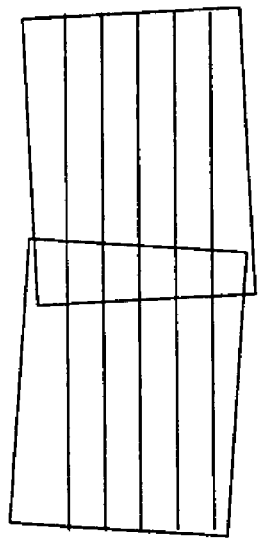
(BEFORE CORRECTING)
⇧
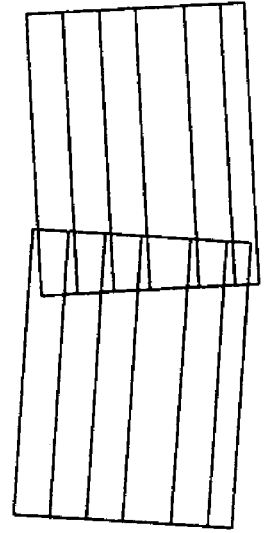
(AFTER CORRECTING)

FIG. 12A
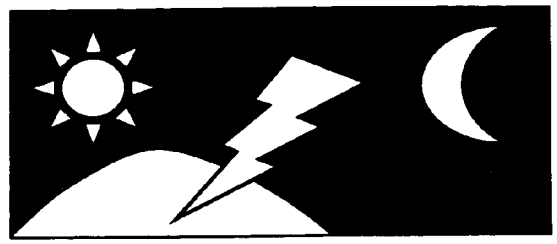
(ORIGINAL IMAGE)
FIG. 12B
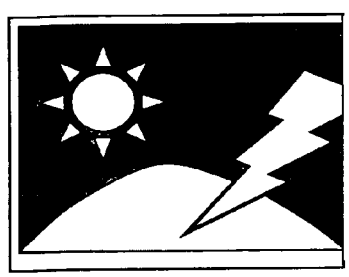   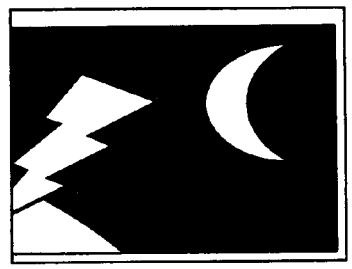
(ALLOCATION OF IMAGE TO PJUa)   (ALLOCATION OF IMAGE TO PJUb)
FIG. 12C
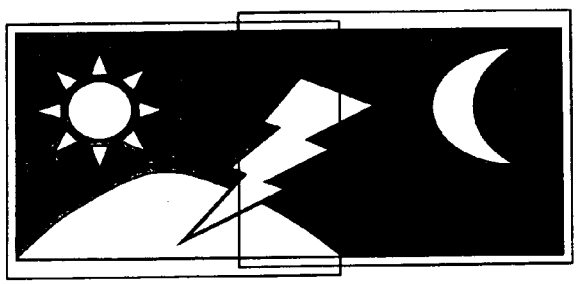
(IMAGE PROJECTED BY TWO PROJECTOR UNITS PJUa AND PJUb)

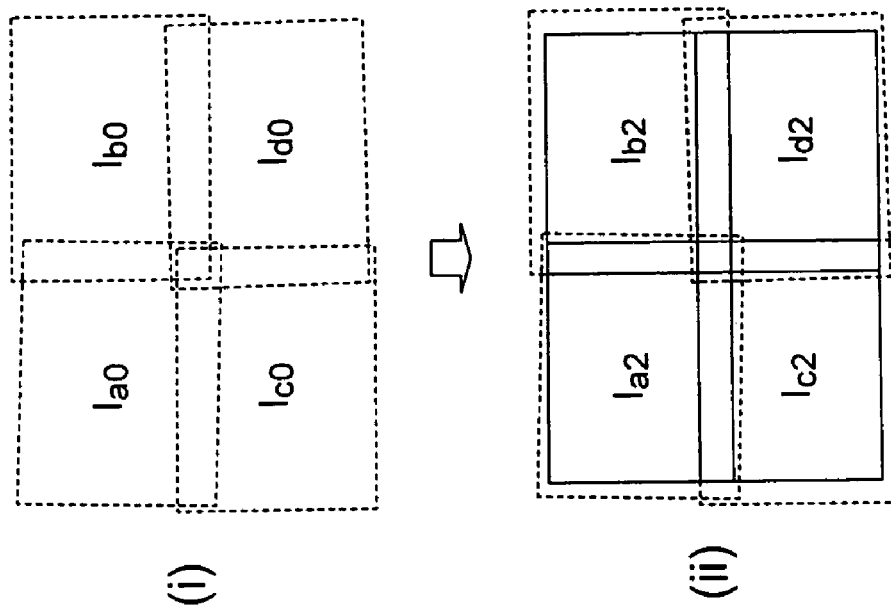
FIG. 16B (NO TRAPEZOIDAL DISTORTION)
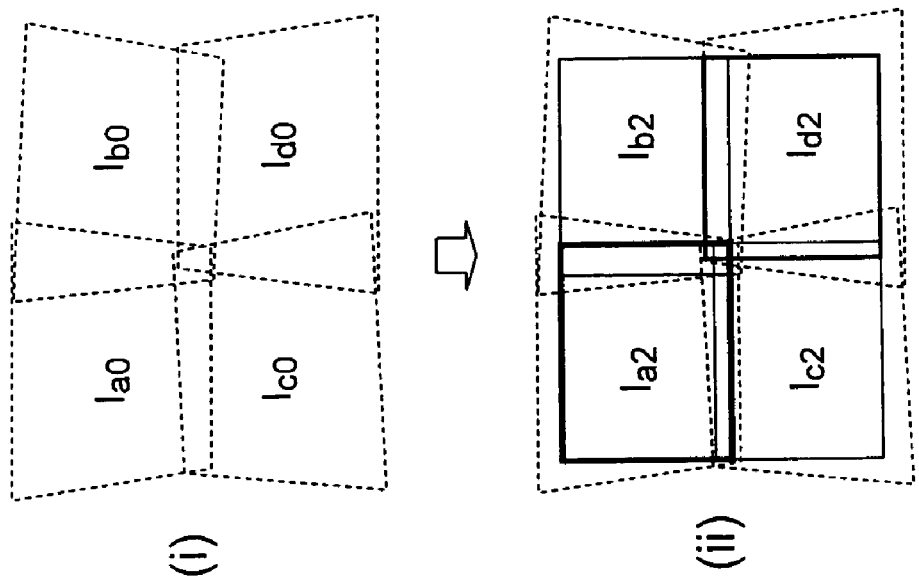
FIG. 16A (TRAPEZOIDAL DISTORTION)

FIG. 17A
FIG. 17B
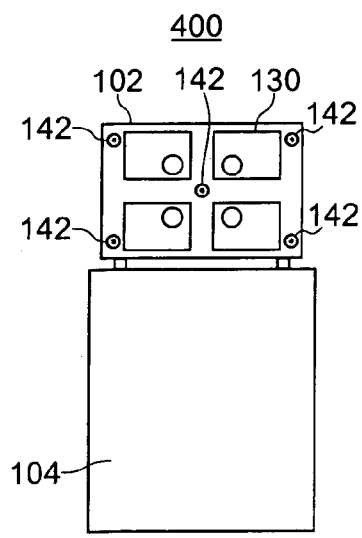
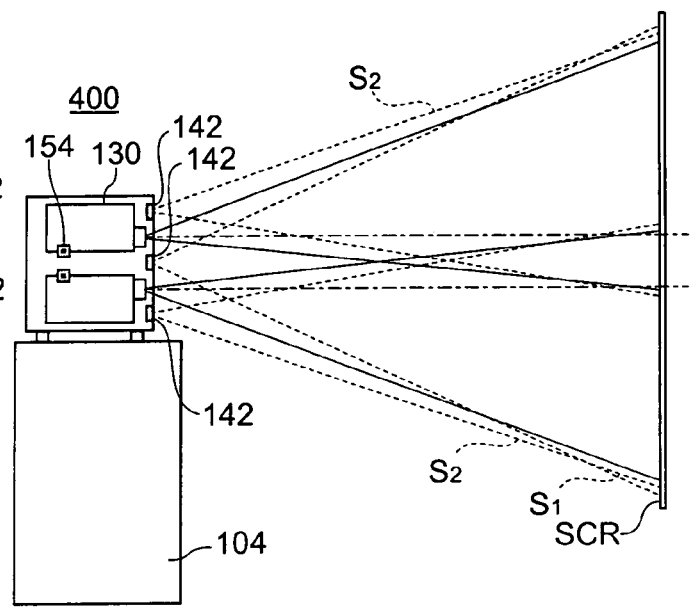
FIG. 17C
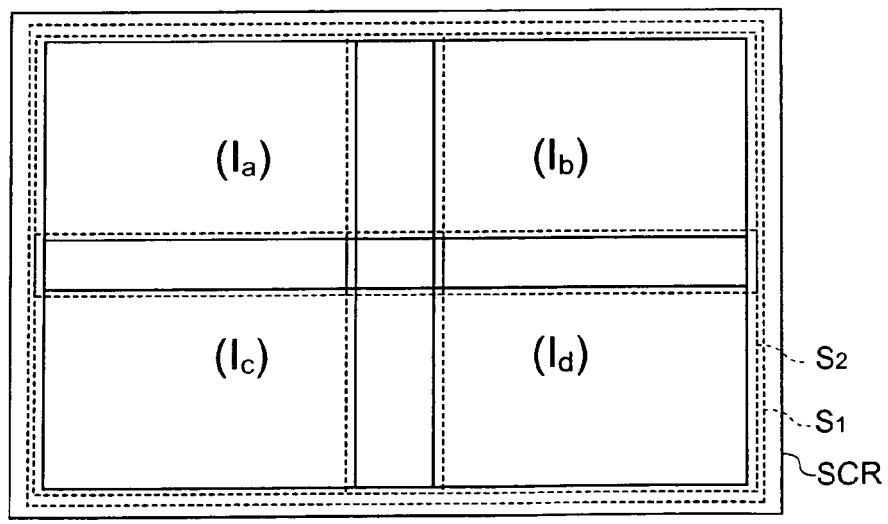

FIG. 19A
FIG. 19B
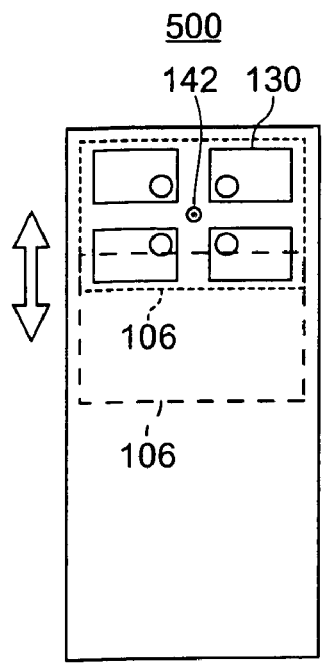
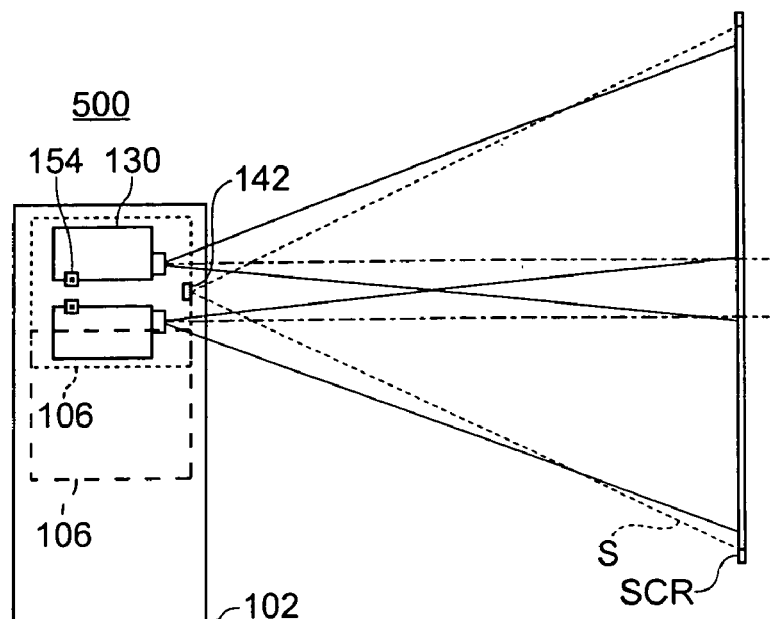
FIG. 19C
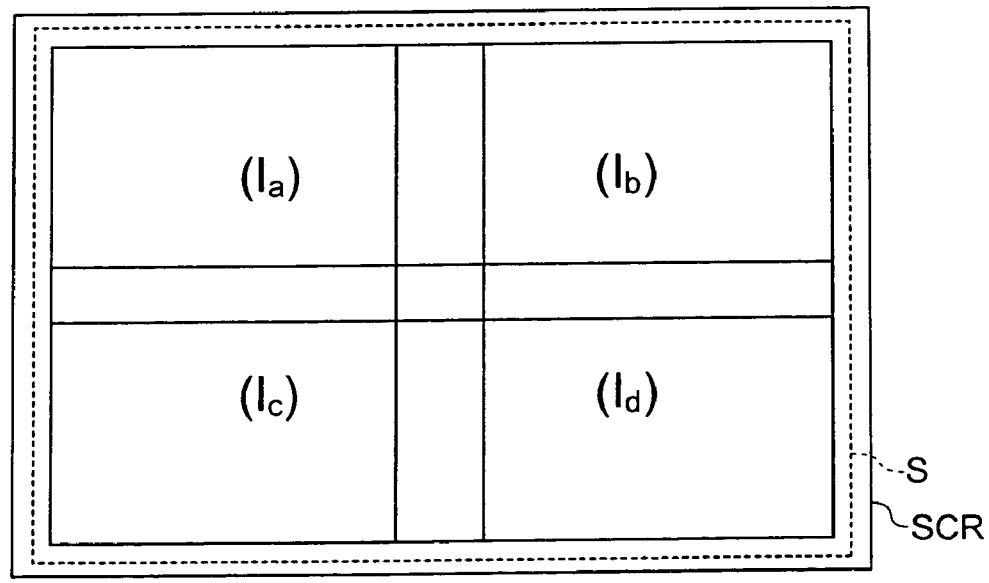

FIG. 22A

| | |
|---|---|
| Ia<br>RELATIVE LIGHTNESS<br>BEFORE ADJUSTING:<br>100% | Ib<br>RELATIVE LIGHTNESS<br>BEFORE ADJUSTING:<br>95% |
| Ic<br>RELATIVE LIGHTNESS<br>BEFORE ADJUSTING:<br>90% | Id<br>RELATIVE LIGHTNESS<br>BEFORE ADJUSTING:<br>95% |

100 — SCR

FIG. 22B

| | |
|---|---|
| Ia<br>RELATIVE LIGHTNESS<br>BEFORE ADJUSTING: 100%<br>ADJUSTED AMOUNT<br>OF LIGHT: 10%<br>RELATIVE LIGHTNESS<br>AFTER ADJUSTING: 90% | Ib<br>RELATIVE LIGHTNESS<br>BEFORE ADJUSTING: 95%<br>ADJUSTED AMOUNT<br>OF LIGHT: 5%<br>RELATIVE LIGHTNESS<br>AFTER ADJUSTING: 90% |
| Ic<br>RELATIVE LIGHTNESS<br>BEFORE ADJUSTING: 90%<br>ADJUSTED AMOUNT<br>OF LIGHT: 0%<br>RELATIVE LIGHTNESS<br>AFTER ADJUSTING: 90% | Id<br>RELATIVE LIGHTNESS<br>BEFORE ADJUSTING: 95%<br>ADJUSTED AMOUNT<br>OF LIGHT: 5%<br>RELATIVE LIGHTNESS<br>AFTER ADJUSTING: 90% |

600 — SCR

ADJUSTMENT OF BRIGHTNESS BY LIQUID CRYSTAL DEVICE IN PROJECTOR UNIT HAVING HIGHEST BRIGHTNESS LEVEL

ADJUSTMENT OF BRIGHTNESS BY SOLID-STATE LIGHT SOURCE CONTROL UNIT IN PROJECTOR UNIT HAVING HIGHEST BRIGHTNESS LEVEL

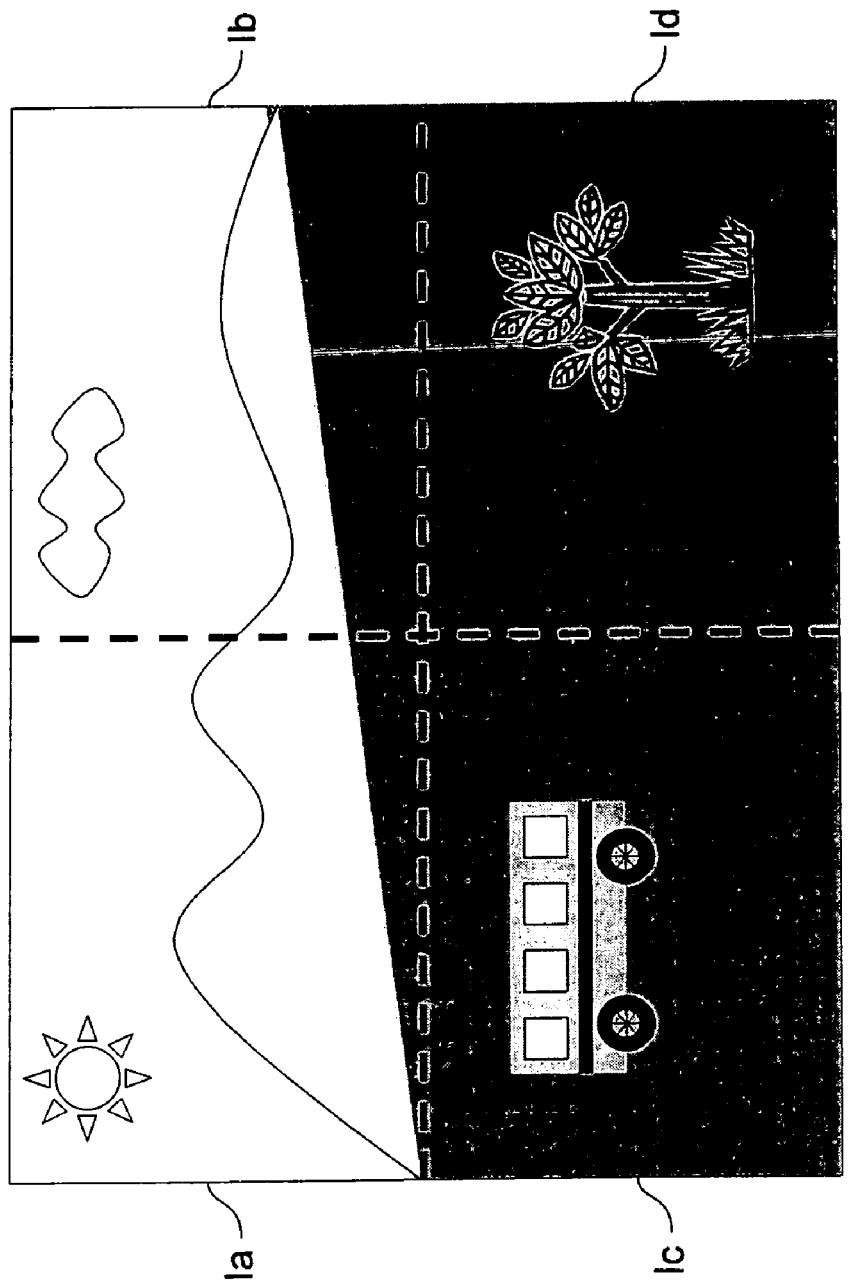
FIG. 25 FOUR-DIVIDED IMAGE

FRONT PROJECTION TYPE MULTI-PROJECTION DISPLAY

BACKGROUND

Exemplary aspects of present invention to a front projection type multi-projection display.

A related art front projection type multi-projection display includes a plurality of projector units (projection optical unit) arranged in a horizontal direction and in a vertical direction and projection images from the plurality of projector units are projected onto a screen in a magnified scale to display one large screen image. For example, see Japanese Unexamined Patent Application Publication No. 8-82854, Japanese Unexamined Patent Application Publication No. 8-94974, Japanese Unexamined Patent Application Publication No. 2001-339672, International Publication Pamphlet No. 99/31877, Japanese Unexamined Patent Application Publication No. 9-326981, Japanese Unexamined Patent Application Publication No. 2001-251651, Japanese Unexamined Patent Application Publication No. 6-178327, Japanese Unexamined Patent Application Publication No. 9-211386 and U.S. Pat. No. 5,956,000. Such a multi-projection display can display images with high definition and high brightness, as compared to other related art projectors. Thus, it is expected that the multi-projection display will have wide commercial applications in future in business fields, such as cinemas, art galleries, museums, seminar halls, assembly halls, mini-theaters, public institutes, and companies or for domestic uses, such as an amusement and a home theater.

But, in such a multi-projection display, if the projection images from the respective projector units are not connected smoothly to each other on the screen, it is impossible to match the projection images from the respective projector units to each other. Further, a boundary is remarkable, and then image quality is lowered.

For this reason, in the multi-projection display disclosed in Japanese Unexamined Patent Application Publication No. 8-82854 and Japanese Unexamined Patent Application Publication No. 8-94974, in order to solve the above problem, the projection images from the respective projector units are made not to overlap each other on the screen and the joint portions thereof become small.

However, in such a multi-projection display, there is a problem in that at the time of setting up, it is not easy to remove joint portions of the projection images from the respective projector units or connect the projection images without inconsistency.

For this reason, in the multi-projection display disclosed in Japanese Unexamined Patent Application Publication No. 2001-339672, International Publication Pamphlet No. 99/31877, Japanese Unexamined Patent Application Publication No. 9-326981, Japanese Unexamined Patent Application Publication No. 2001-251651, Japanese Unexamined Patent Application Publication No. 6-178327, Japanese Unexamined Patent Application Publication No. 9-211386, and U.S. Pat. No. 5,956,000, in order to solve the above problem, the projection images from adjacent projector units are made to overlap partially on the screen such that the projection images are smoothly connected to each other in the overlapped region.

However, in such a multi-projection display, if how the projection images from the respective projector units are displayed on the screen is not known accurately, it is impossible to smoothly connect the projection images on the screen. Thus, in the multi-projection display disclosed in Japanese Unexamined Patent Application Publication No. 2001-339672, International Publication Pamphlet No. 99/31877, Japanese Unexamined Patent Application Publication No. 9-326981 and Japanese Unexamined Patent Application Publication No. 2001-251651, an image-capturing device, such as a monitoring camera or a digital camera is provided at viewer's side and the projection images (adjusting images) from the respective projector units which are displayed on the screen are captured, such that how the projection images are displayed on the screen can be accurately measured.

SUMMARY

However, in the multi-projection display disclosed in Japanese Unexamined Patent Application Publication No. 2001-339672, International Publication Pamphlet No. 99/31877, Japanese Unexamined Patent Application Publication No. 9-326981 and Japanese Unexamined Patent Application Publication No. 2001-251651, since the image-capturing device is provided at the viewer's side to capture the adjusting images, after finishing the adjustment, it is followed by rearranging the image-capturing device (the image-picturing device is removed). Therefore, if the viewer wants to adjust the images again, it needs to provide the image-capturing device. In this regard, the image-capturing device has to be disposed in a precise position with respect to the multi-projection display. Thus, there are problems in that since the installation of the image-capturing device is performed by a general user, the adjustment operation becomes complicated and it takes much time to perform the adjustment operation.

Accordingly, exemplary aspects of the present invention address and/or solve the above and/or other problems. Exemplary aspects of the present invention provide a multi-projection display which can further shorten the adjustment time and easily perform the adjustment.

The present inventors have studied to attain the above and then discovered that the above can be attained by providing an image-capturing device in a housing of a front projection type multi-projection display to shorten the adjustment time and easily perform the adjustment operation, thereby completing an exemplary aspect of the present invention.

(1) A front projection type multi-projection display of an exemplary aspect of the present invention includes a plurality of projector units to modulate and project light from a light source based on image information, an image-capturing device disposed in a housing to capture predetermined regions of the projection images projected onto the screen, a unit image information generating unit to generate image information (hereinafter "unit image information") to be input to each of the plurality of projector units, and a unit image information correcting unit to correct the unit image information based on a result captured by the image-capturing device.

Accordingly, according to the front projection type multi-projection display of an exemplary aspect of the present invention, the image-capturing device is provided in the housing of the front projection type multi-projection display to capture the projection image. Therefore, if the image-capturing device is provided in the housing of the front projection type multi-projection display in an appropriate position, there is no need to rearrange the image-capturing device after image-capturing process, such as in the related arts. As a result, the adjustment operation is easily performed in a reduced time.

According to the front projection type multi-projection display of an exemplary aspect of the present invention, since the image-capturing device is provided in the housing of the front projection type multi-projection display, it is easy to provide the image-capturing device in a precise position with respect to the screen. Therefore, it is possible to capture the projection images more accurately and easily, compared to the related art.

Further, according to the front projection type multi-projection display of an exemplary aspect of the present invention, since the image-capturing device is provided in the housing of the front projection type multi-projection display, it is possible to easily achieve the precise positional information of the image-capturing element with respect to the projector units. As a result it is possible to analyze more accurately the projection image, compared to the related art.

Furthermore, according to the front projection type multi-projection display of an exemplary aspect of the present invention, since the image-capturing device is provided in the housing of the front projection type multi-projection display, it is easy to put the control circuit to process a result captured by the image-capturing device in the housing and as a result it is easy to move and install the front projection type multi-projection display.

Therefore, the front projection type multi-projection display of an exemplary aspect of the present invention having a small size can be used commercially and in homes.

The image-capturing elements in the image-capturing device can be provided inside the housing of the front projection type multi-projection display, and it can be also provided outside the housing, that is, in the front, the upper side, or the side thereof.

(2) The front projection type multi-projection display according to the above (1), may include an external light state evaluating unit to evaluate a state of external light by capturing the screen in a state when the light source does not emit or weakly emits, and the amount of light emitted from the light source may be controlled based on a result evaluated by the external light state evaluating unit.

According to the above structure, in the presence of a strong external light, the amount of light emitted from the light source is correspondingly increased to lessen the effect of the external light during the image capturing process.

(3) In the front projection type multi-projection display according to the above (2), the external light state evaluating unit may have a function of evaluating the state of the external light by capturing the screen based on the amount of light which is emitted from the light source at least two emitting levels.

Generally, since the effect of the external light on the image quality is non-linear, the state of the external light is evaluated by capturing the screen based on an amount of light which is emitted from the light source at at least two emitting levels to lessen the effect of the external light during the image-capturing process.

(4) In the front projection type multi-projection display according to any one of the above (1) to (3), the image-capturing device can change a capturing range.

According to the above structure, it is possible to capture images with a wide capturing range and a high magnification and to capture efficiently the projection image in various capturing modes.

Further, it is possible to obtain information concerning the positional relation of the front projection type multi-projection display with respect to the screen, and as a result it is possible to dispose the front projection type multi-projection display in an appropriate position with respect to the screen.

The capturing range is changed by varying the position or orientation of the image-capturing device or by varying the construction of an optical system, such as a lens, in the image-capturing device.

In this case, the image-capturing device further has a zoom-function and an auto-focus function. Therefore, since it is possible to change the capturing range or the magnifications with the zoom-function, the degree of freedom or flexibility of capturing is enhanced. Further, since the focus is automatically adjusted with the auto-focus function, the convenience is greatly enhanced.

(5) In the front projection type multi-projection display according to any one of the above (1) to (4), the image-capturing device may have a plurality of image-capturing elements.

According to the above structure, since the image-capturing element to be used can be just selected by a capturing object, it is possible to reduce the capturing time. Accordingly, the adjustment time is also reduced, and the precision of capturing and adjustment can be enhanced.

Further, since it is possible to reduce the capturing area for every image-capturing element, the projection image can be captured by using an inexpensive image-capturing element with the relatively low resolution. Therefore, the increase in the price of the front projection type multi-projection display can be minimized.

(6) In the front projection type multi-projection display according to any one of (1) to (5), the image-capturing device can capture the entire screen.

According to the above structure, it is possible to enhance the color balance and brightness balance in the entire screen.

Further, it is possible to obtain information concerning the positional relation of the front projection type multi-projection display with respect to the screen, and as a result it is possible to dispose the front projection type multi-projection display in an appropriate position with respect to the screen.

In the front projection type multi-projection display according to any one of the above (1) to (6), the unit image information correcting unit may correct the unit image information based on a result of capturing adjusting unit images projected by the projector units.

The unit image information correcting unit may perform the correction of the unit image information based on a result of capturing a normal image. However, by correcting the unit image information based on the result of capturing the adjusting unit image, it is possible to perform the more accurate correction rapidly.

As the adjusting unit image, various unit images suitable to perform the correction of the unit image information, such as a beta image of white or monochrome, a lattice shape of monochrome, may be used.

In this case, it may be constructed such that the adjusting image information is stored in advance in an adjusting image information storing unit and the unit image information generating unit generates the adjusting unit image using the adjusting image information at the time of the adjustment operation. The adjusting unit image information may be stored in advance in the adjusting image information storing unit and at the time of the adjustment operation, the adjusting unit image information may be used as it is.

Further, every time the adjustment operation is performed, the adjusting image information may be inputted in the adjusting image information storing unit (by a DVD or the like) and the unit image information generating unit may generate the adjusting unit image information using the adjusting image information. Further, every time the adjustment operation is performed, the adjusting unit image information may be inputted directly in the adjusting image information storing unit.

(7) In the front projection type multi-projection display according to any one of the above (1) to (6), the unit image information correcting unit may correct shapes, positions and/or inclinations of unit images to be projected by the projector units.

According to the above structure, the shapes, the positions and/or the inclinations of the projection images from the respective projector units become proper. Thus it is possible to satisfactorily match the projection images from the respective projector units to each other.

(8) In the front projection type multi-projection display according to any one of the above (1) to (7), the unit image information correcting unit may correct the brightness and/or colors of unit images to be projected by the projector units.

According to the above structure, the brightness and/or colors of the projection images from the respective projector units becomes proper. Thus it is possible to highly match the projection images from the respective projector units.

(9) In the front projection type multi-projection display according to any one of the inventions (1) to (8), the unit image information correcting unit may correct the brightness and/or color for every pixel in the plurality of projector units.

According to the above structure, it is possible to further match the projection images from the respective projector units. Thus it is possible to project the images extremely true to original image information onto the screen.

In this case, the unit image information correcting unit may have a function of correcting the unit image to the brightness and/or color for every pixel in the respective projector units by comparing all of the adjusting image, which is formed by a plurality of adjusting unit images projected by the plurality of projector units with an original adjusting image.

(10) In the front projection type multi-projection display according to any one of the above (1) to (9), the unit image information correcting unit may correct the unit image information using correction parameters that are determined based on the captured result.

According to the above structure, after the correction parameters are determined based on the captured result, it is possible to easily correct the unit image information using the correction parameters.

(11) In the front projection type multi-projection display according to the above (10), the display may include a correction parameter storing unit to store the correction parameters.

According to the above structure, it is possible to make the required storage capacity smaller than that when storing the captured result itself. Further, it is possible to make the calculation quantities when correcting the unit image information small.

(12) In the front projection type multi-projection display according to the above (10) or (11), the display may include an automatic correction parameter acquiring device to capture an adjusting image in certain circumstances to automatically acquire the correction parameters.

According to the above structure, for example, when the correction parameters needs to be re-determined (re-acquired) (for example, when three months have lapsed after re-acquiring), the automatic correction parameter acquiring device may operate automatically to acquire the correction parameters again. Further, when the regular time comes every day (for example, at 4 a.m.), the automatic correction parameter acquiring device may operate automatically to acquire the correction parameters again. Thus, without troubling the user's hand, it is possible to maintain smooth image quality, and further convenience is enhanced.

Further, even though the characteristics of the light source or the electro-optical modulating device are changed by variation per hour, the correction parameters corresponding to the change in characteristic can be automatically acquired. Thus, it is possible to constantly suppress deterioration of image quality due to the variation per hour.

(13) In the front projection type multi-projection display according to any one of the exemplary aspects of the invention (1) to (12), the display may include an optical correcting device to correct the position and/or orientation of an optical element provided in the front projection type multi-projection display.

According to the above structure, after the position and/or orientation of the optical element is corrected, smooth image quality is acquired. Since the correction is optically performed, there is no deterioration of image quality due to the adjustment operation.

The optical element includes the projector unit itself and a projection lens of the projector unit.

In this case, after the position and/or orientation of the optical element is optically corrected, the capturing operation is performed again by using the image-capturing device. Then the correction parameters are determined based on the captured result.

According to the above operation, after rough correction is optically performed, detail correction is electronically performed. Further, it is possible to suppress deterioration of image quality to be generated when the unit image information correcting unit corrects the unit image information, to a minimum.

(14) In the front projection type multi-projection display according to an exemplary aspect of the invention (13), the display may include an automatic optical element correcting device to capture an adjusting image in certain circumstances to automatically correct the position and/or orientation of the optical element.

According to the above structure, for example, when correction of the optical elements is required (for example, when three months have lapsed after re-acquisition), or at a regularly scheduled time everyday (for example, at 4 a.m.), the automatic optical element correcting device automatically operates to correct the position and/or orientation of the optical elements. Accordingly, it is possible to maintain uniformly the image quality without bothering the user to enhance the convenience.

(15) In the front projection type multi-projection display according to the above (2) or (3), the external light state evaluating unit further has a function of automatically evaluating the state of the external light by capturing the screen in certain circumstances.

The certain circumstances refer to a case when a power supply is supplied to the front projection type multi-projection display or at thirty minutes after supplying the power supply to the front projection type multi-projection display.

(16) In the front projection type multi-projection display according to any one of the above (1) to (15), the light source may be a solid-state light source.

According to the above structure, since the LED light sources which can acquire a stable emitting state immediately after being turned on is used, it is possible to drastically shorten the time required until the image-capturing device captures the projection image to be projected onto the screen for every projector unit. As a result, the adjustment time to match the projection images from the respective projector units is drastically shortened, which greatly enhances the convenience of the display device.

According to the front projection type multi-projection display of an exemplary aspect of the present invention, since the LED light sources can be easily set to a turned-on state or a turned-off state, a shutter that makes the apparatus complicated is no longer needed. Also, since the LED light sources can acquire the stable emitting state immediately after being turned on, it is possible to begin capturing at once. Further, the time needed to operate the shutter can be shortened. Thus the adjustment time can be further shortened.

Further, according to the front projection type multi-projection display of an exemplary aspect of the present invention, since the output of the solid-state light source is varied in response to the intensity of the external light, it is possible to perform the adjustment operation with a proper intense light compared with the intensity of the external light. Therefore, it is possible to capture accurately the projection images at any time. In this case, even though the output of the solid-state light source changes high or low, the color temperature is not almost changed. Thus, it does not affect on the captured result.

In the front projection type multi-projection display according to the above (16), the solid-state light source may be an LED light source, a semiconductor laser light source, a solid-state laser light source, or an EL light source.

According to the above structure, a stable emitting state can be obtained to perform easily the adjustment operation, and the front projection type multi-projection display also has a sufficient brightness and color-rendering property.

(17) The front projection type multi-projection display according to any one of the above (16) may include a solid-state light source control unit to control the amount of light emitted from the solid-state light source separately for every projector unit.

In the front projection type multi-projection display, generally, due to unevenness in characteristic in the light source or the electro-optical modulating device, it is the present situation that a brightness characteristic or a color characteristic for every projector unit is different. For this reason, in the front projection type multi-projection display, a voltage to be applied to the electro-optical modulating device for every projector unit is adjusted such that the difference of the brightness characteristics or the color characteristics is absorbed. As a result, in the front projection type multi-projection display, by performing the adjustment, the gradation source is needed to be used in the electro-optical modulating device, which results in problems in that the number of effective gradations inherent in the front projection type multi-projection display is lowered or the dynamic range becomes narrow.

According to the front projection type multi-projection display of an exemplary aspect of the present invention, by controlling the amount of light emitted from the solid-state light source for every projector unit, it is possible to absorb the difference of the brightness characteristics or the color characteristics. For this reason, according to the front projection type multi-projection display of an exemplary aspect of the present invention, since there is no need to use the gradation source in the electro-optical modulating device, there is no case in which the number of effective gradations inherent in the front projection type multi-projection display is lowered or the dynamic range becomes narrow.

In this case, in order to absorb the difference of the brightness characteristic for every projector unit, in the projector units other than the projector unit having the lowest brightness level, the amount of light emitted from the solid-state light source may be lowered such that the brightness level in the projector units complies with the brightness level in the projector unit having the lowest brightness level.

Further, in order to absorb the difference of the color characteristic for every projector unit, the above-mentioned adjustment may be performed for every color light component.

Moreover, in the front projection type multi-projection display of an exemplary aspect of the invention, unlike a case in which the high pressure mercury lamp or the metal halide lamp is used as the light source, even though the output of the solid-state light source changes high or low irrespective of the height of voltage, the color temperature is not almost changed. Thus, there is no deterioration of the image quality.

In the front projection type multi-projection display according to the above (17), the solid-state light source control unit may have a function of dynamically controlling the amount of light emitted from the solid-state light source.

According to the above function, in the case in which a totally dark screen is displayed (for example, a case in which a night scene in a movie is displayed), instead of or in addition to lowering the transmittance of the electro-optical modulating device, by decreasing the amount of light emitted from the solid-state light source, it is possible to make an entire screen dark. Further, in the case in which a totally bright screen is displayed (for example, a case in which an outdoor scene in the daytime in a movie is displayed), instead of or in addition to increasing the transmittance of the electro-optical modulating device, by increasing the amount of light emitted from the solid-state light source, it is possible to make the entire screen bright. For this reason, it is possible to increase the number of effective gradations or the dynamic range, compared to that of the related art, which results in a high image quality multi-projection display having an excellent black level.

In this case, if the solid-state light source control unit is allowed to dynamically control the amount of light emitted from the solid-state light source, for each projector unit, when an image in which a bright screen and a dark screen exist in one screen is displayed, it is possible for the front projection type multi-projection display to exhibit the expression ability exceeding the number of effective gradation or the dynamic range inherent in the front projection type multi-projection display. In addition, it is possible to perform high image quality display.

In the front projection type multi-projection display according to the above (17), the solid-state light source control unit may have a function of controlling a voltage to be supplied to the solid-state light source for every projector unit or for every electro-optical modulating device.

According to the above structure, it is possible to easily decrease or increase the amount of light emitted from the solid-state light source for every projector unit or for every electro-optical modulating device.

In the front projection type multi-projection display according to the above (17), the solid-state light source control unit may have a function of controlling an emitting period of the solid-state light source for every projector unit or for every electro-optical modulating device.

According to the above structure, it is also possible to easily decrease or increase the amount of light emitted from the solid-state light source for every projector unit or for every electro-optical modulating device.

In the front projection type multi-projection display according to the above (17), the electro-optical modulating device may be a liquid crystal device which writes one unit screen information twice or more, and the solid-state light source control unit has a function of allowing the solid-state light source to emit during one frame outside at least the first writing period of the liquid crystal device.

In the front projection type multi-projection display using the liquid crystal device as the electro-optical modulating device, since the liquid crystal device is a hold type display device, unlike a case of a CRT of an impulse type display device, there is a problem in that a smooth moving picture display is not obtained due to a so-called tailing phenomenon (as regards the tailing phenomenon, see "Image Quality of Moving Picture Display in a Hold Type Display" IEICE Technical Report, EID99-10, pages 55 to 60 (1999-06)).

According to above the front projection type multi-projection display, by performing writing twice or more to one unit screen information, it is possible to make a flicker inconspicuous. Further, a liquid crystal device of a so-called n-time speed driving (here, n is a natural number of 2 or more) is used and the solid-state light source is allowed to emit outside at least the first writing period of the liquid crystal device. Thus, it becomes possible to project intermittently the projection images onto the screen. For this reason, it is possible to alleviate the tailing phenomenon which is a defect of the hold type display. Further it is possible to perform moving picture display smoothly with favorable quality.

Further, according to the above front projection type multi-projection display, the solid-state light source is allowed to emit during one frame outside the first writing period at which liquid crystal molecules do not yet sufficiently response. Thus, there is also an advantage in that it is possible to further enhance contrast in the front projection type multi-projection display.

In the above front projection type multi-projection display, the electro-optical modulating device may be a liquid crystal device which writes an image sequentially for every screen region, and the solid-state light source control unit has a function of allowing the solid-state light source to emit during one frame outside the image writing periods of the liquid crystal device.

For this reason, according to the above front projection type multi-projection display, during one frame or the like, a liquid crystal device which is capable of making a flicker inconspicuous by writing sequentially images for every screen region is used, and the solid-state light source is allowed to emit outside the image writing periods of the liquid crystal device. Thus, it becomes possible to project intermittently the projection images onto the screen. For this reason, it is possible to alleviate the tailing phenomenon which is a defect of the hold type display. Further it is possible to perform moving picture display smoothly with favorable quality.

Further, according to the above front projection type multi-projection display of an exemplary aspect of the invention, the solid-state light source is allowed to emit outside the image writing periods. Thus, there is also an advantage in that it is possible to further enhance contrast in the front projection type multi-projection display.

BRIEF DESCRIPTION OF THE DRAWINGS

FIG. 2 is a schematic showing a construction of a projector unit in the front projection type multi-projection display according to the first exemplary embodiment;

FIGS. 6(i)-6(iii) are schematics illustrating advantages of the front projection type multi-projection display according to the first exemplary embodiment;

FIG. 7 is a schematic illustrating advantages of the front projection type multi-projection display according to the first exemplary embodiment;

FIGS. 12A-12C are schematics illustrating advantages of the front projection type multi-projection display according to the first exemplary embodiment;

FIGS. 14(i)-14(iii) are schematics illustrating advantages of the front projection type multi-projection display according to the second exemplary embodiment;

FIGS. 16A and 16B are schematics illustrating advantages of the front projection type multi-projection display according to the third exemplary embodiment;

FIGS. 17A-17C are schematics illustrating a construction of a front projection type multi-projection display according to a fourth exemplary embodiment;

FIGS. 19A-19C are schematics illustrating a construction of a front projection type multi-projection display according to a fifth exemplary embodiment;

FIGS. 22A and 22B are schematics illustrating advantages of the front projection type multi-projection display according to the sixth exemplary embodiment;

FIG. 25 is a schematic illustrating advantages of a front projection type multi-projection display according to an eighth exemplary embodiment;

DETAILED DESCRIPTION OF EXEMPLARY EMBODIMENTS

First Exemplary Embodiment

Figure 1A:
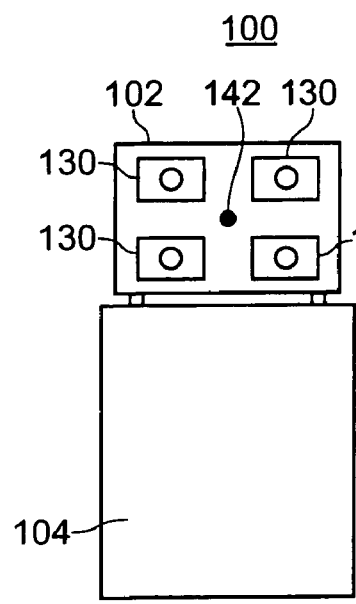
FIGS. 1A-1B are schematics showing a construction of a front projection type multi-projection display according to a first exemplary embodiment.
Figure 1B:
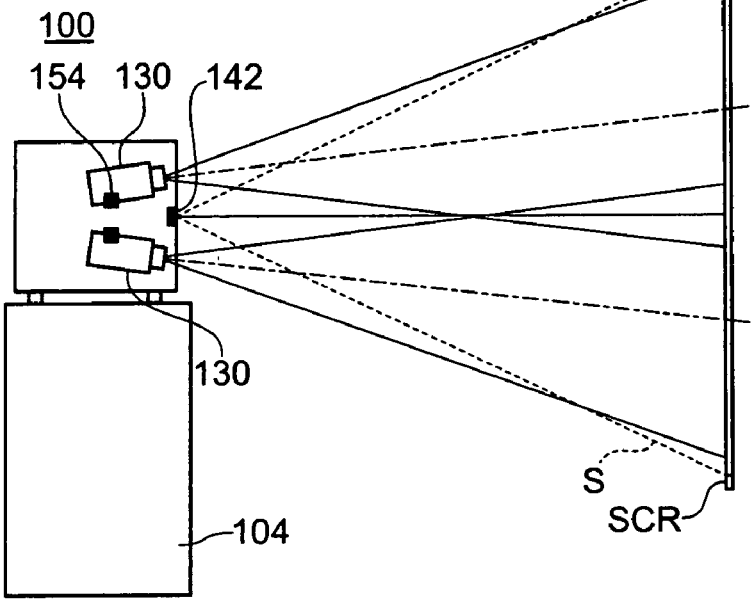
Figure 1C:
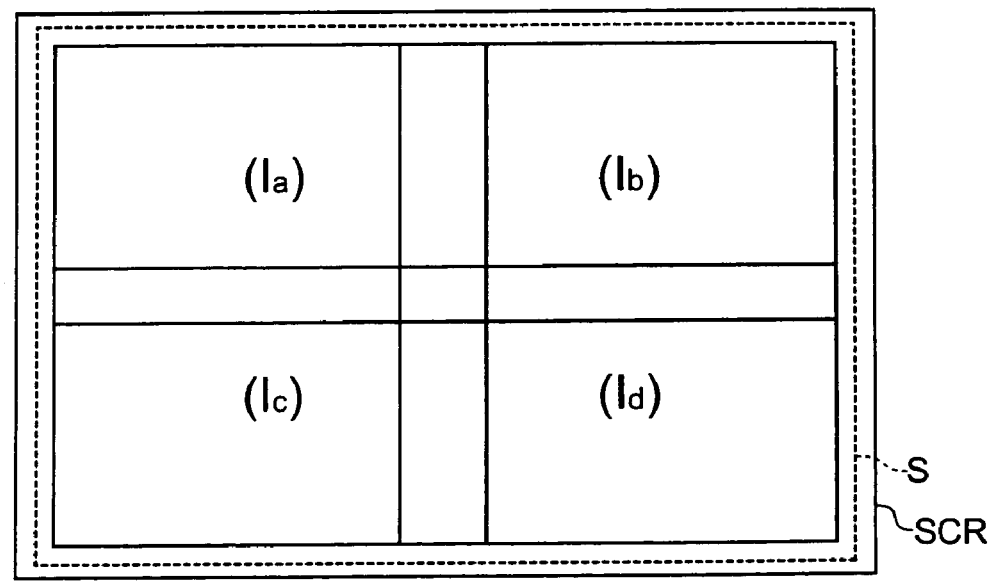
Figure 3:
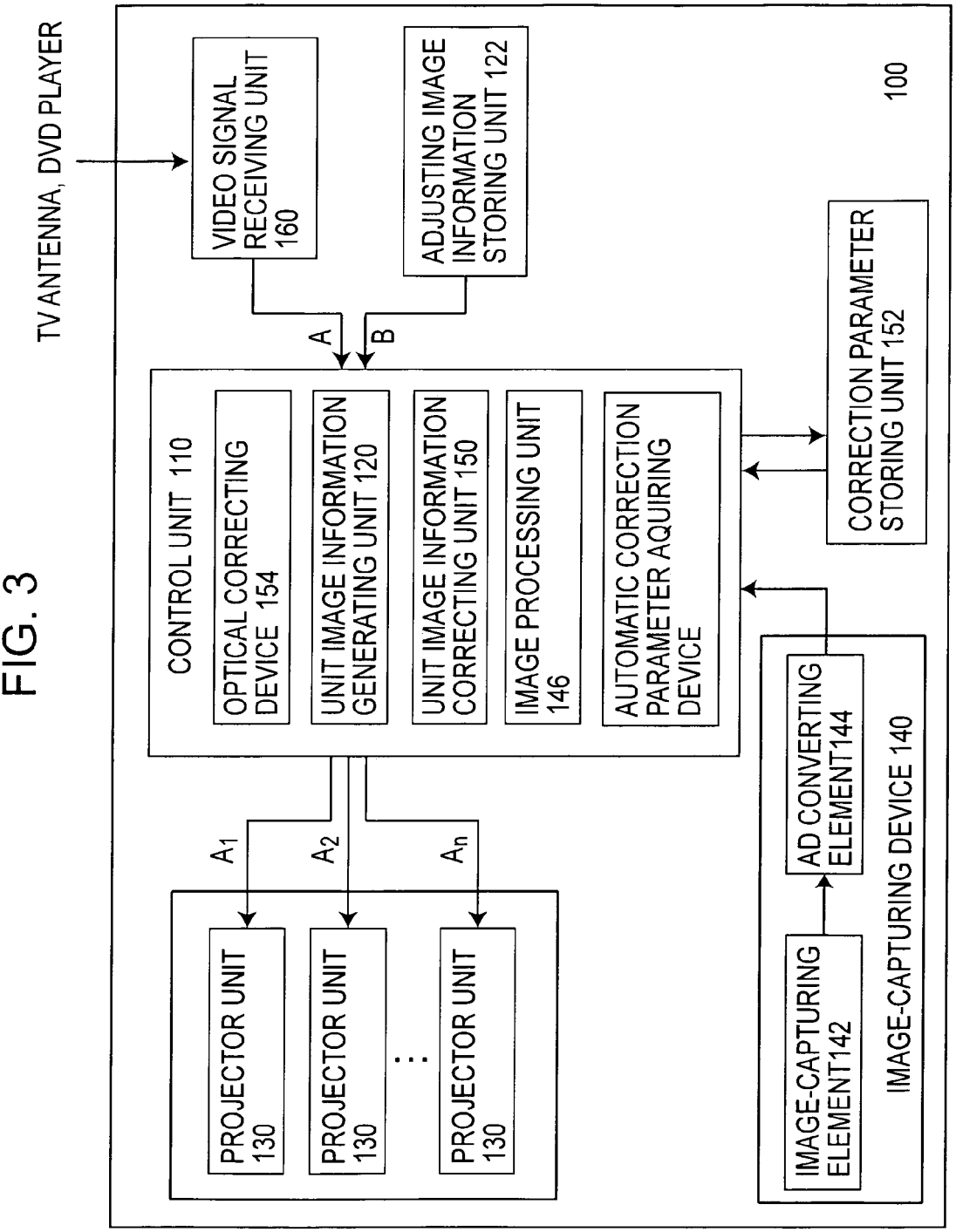
FIG. 3 is a schematic showing an outline of the front projection type multi-projection display according to the first exemplary embodiment.
Figure 4:
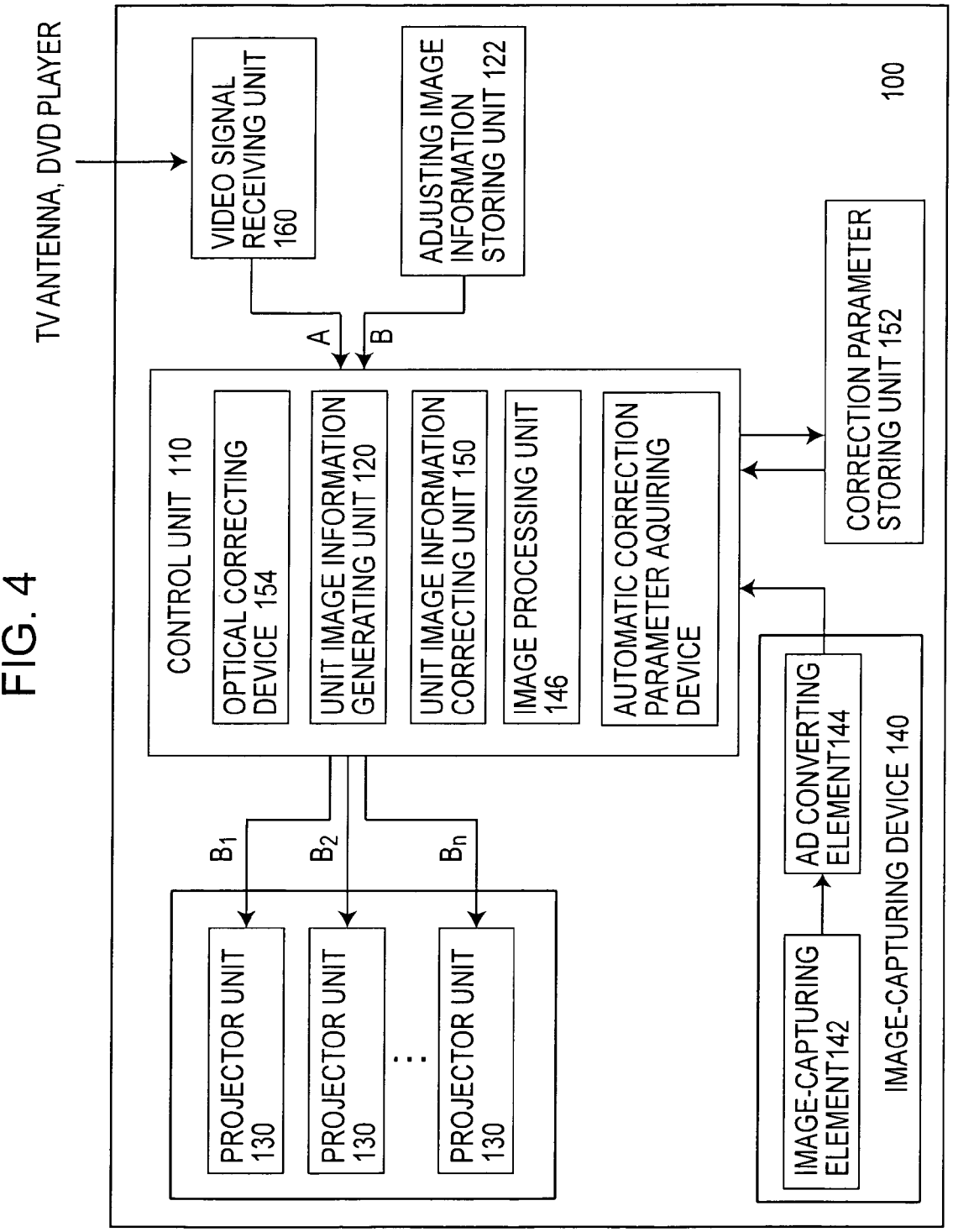
FIG. 4 is a schematic showing an outline of the front projection type multi-projection display according to the first exemplary embodiment.
Figure 5:
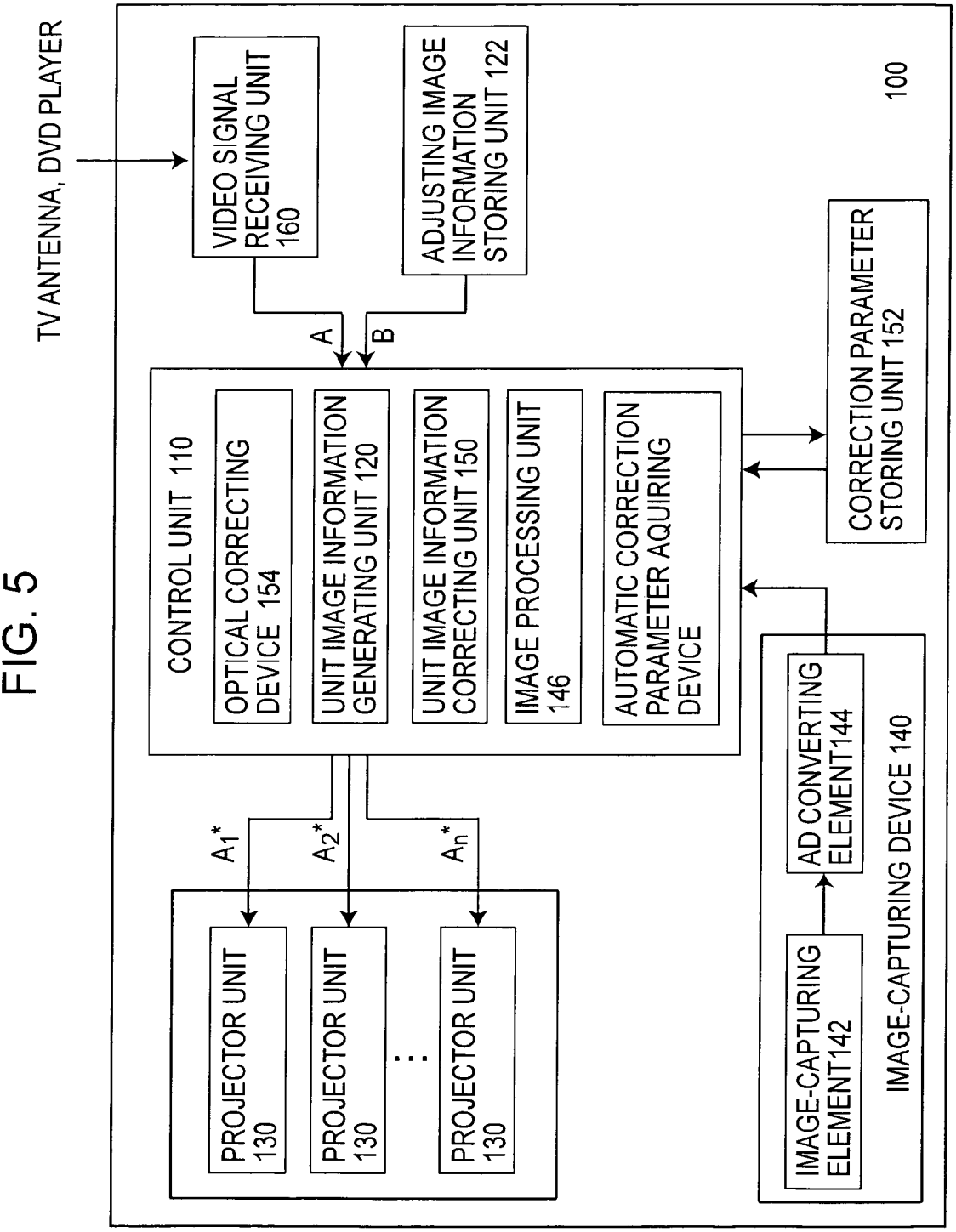
FIG. 5 is a schematic showing an outline of the front projection type multi-projection display according to the first exemplary embodiment.

FIGS. 1A-1C are schematics showing a construction of a front projection type multi-projection display according to a first exemplary embodiment. FIG. 1A is a front view thereof, FIG. 1B is a cross-sectional view as viewed from a side, and FIG. 1C is a view showing a projection image projected onto the screen. FIG. 2 is a schematic showing a construction of a projector unit in the front projection type multi-projection display according to the first exemplary embodiment. FIGS. 3 to 5 are schematics showing an outline of the front projection type multi-projection display according to the first exemplary embodiment.

As shown in FIG. 1, the front projection type multi-projection display 100 according to the first exemplary embodiment is a front projection type multi-projection display in which images projected from 4 projector units 130 disposed in a housing 102 are projected onto a screen SCR as a projection plane. The front projection type multi-projection display 100 is provided on a stand 104, as shown in FIGS. 1A and 1B.

As shown in FIG. 2, the respective projector units 130 include LED light sources 132R, 132G, and 132B as a solid-state light source, three liquid crystal devices 134R, 134G, and 134B as an electro-optical modulating device, a cross dichroic prism 136 and a projection lens 138. Illumination light components from the LED light sources 132R, 132G, and 132B are modulated by the liquid crystal devices 134R, 134G, and 134B based on unit image information $A_1$ to $A_n$ (see FIG. 3) or adjusting unit image information $B_1$ to $B_n$ (see FIG. 4) and are projected by the projection lens 138.

The front projection type multi-projection display 100 according to the first exemplary embodiment includes a control unit 110 having a unit image information generating unit 120, a unit image information correcting unit 150, an image processing unit 146, and an optical correcting device 154, four projector units 130, 130, 130, 130 an image-capturing device 140, a video signal receiving unit 160, an adjusting image information storing unit 122, and a correction parameter storing unit 152, as shown in FIGS. 3 to 5.

The unit image information generating unit 120 has a function of generating a plurality of unit image information $A_1$ to $A_n$ based on original image information A (see FIG. 3) and a function of generating the adjusting unit image information $B_1$ to $B_n$ based on the adjusting image information B (see FIG. 4).

The image-capturing device 140 includes an image-capturing element 142 to capture a predetermined region of an adjusting image projected onto the screen SCR and an AD converting element 144 to convert an analog signal from the image-capturing element 142 into a digital signal.

The image processing unit 146 has a function of comparing a result obtained by performing an image processing on the result captured by the image-capturing device 140 to the adjusting image information B to output the comparison result to the unit image information correcting unit 150.

The unit image information correcting unit 150 has a function of correcting unit image information based on the result captured by the image-capturing device 140 such that a boundary between unit images projected by adjacent projector units among the plurality of projector units 130 is not noticeable on the screen SCR. Thus, corrected unit image information $A_1^*$ to $A_n^*$ are output to the respective projector units 130 (see FIG. 5).

The correction parameter storing unit 152 has a function of storing correction parameters determined when the unit image information correcting unit 150 corrects the unit image information.

The adjusting image information storing unit 122 has a function of storing information regarding to adjusting images which are objects to be captured by the image-capturing device 140.

In the front projection type multi-projection display 100 of the first exemplary embodiment, as shown in FIGS. 1A and 1B, the image-capturing device 140 is provided inside (at an inner position immediate to a front of) a housing 102 of the front projection type multi-projection display 100 and has an image-capturing element 142 to capture a projection image.

Accordingly, according to the front projection type multi-projection display 100 of the first exemplary embodiment, if the image-capturing device 140 is provided in the housing 102 of the front projection type multi-projection display 100 in an appropriate position, there is no need to rearrange the image-capturing device after adjustment operation, such as in the related arts. Therefore, there is no need to reinstall the image-capturing device 140 whenever the projection image is captured. As a result, the adjustment operation is easily performed in a reduced time.

According to the front projection type multi-projection display 100 of the first exemplary embodiment, it is easy to provide the image-capturing device 140 in a precise position with respect to the screen SCR. Therefore, it is possible to capture the projection images more accurately and easily, compared to the related arts.

Further, according to the front projection type multi-projection display 100 of the first exemplary embodiment, it is possible to easily achieve the precise positional information of the image-capturing element 142 with respect to the projector units 130. As a result it is possible to analyze more accurately the projection image, compared to the related art.

Further, according to the front projection type multi-projection display 100 of the first exemplary embodiment, it is easy to put the control circuit to process a result captured by the image-capturing device 140 in the housing 102 and as a result it is easy to move and install the front projection type multi-projection display 100.

Therefore, the front projection type multi-projection display 100 according to the first exemplary embodiment having a small size can be used commercially and in homes.

In the front projection type multi-projection display 100 according to the first exemplary embodiment, the image-capturing element 142 in the image-capturing device 140 is provided inside (at an inner position immediate to a front of) the housing 102. However, the present invention is not limited thereto, it can be also provided outside the housing 102, specifically, in the front, the upper side, or the side of the housing 102.

Further, according to the front projection type multi-projection display 100 of the first exemplary embodiment, since the LED light sources 132R, 132G, and 132B which can acquire a stable emitting state immediately after being turned on are used as light sources of the projector units 130, it is possible to drastically shorten the time required until the image-capturing device 140 captures the predetermined region of the adjusting image to be projected onto the screen SCR for every projector unit 130. As a result, the adjustment time to match the projection images from the respective projector units 130 is drastically shortened, which greatly enhances the convenience of the display device.

Further, according to the front projection type multi-projection display 100 of the first exemplary embodiment, since the LED light sources 132R, 132G, and 132B can be easily set to a turned-on state or a turned-off state, a shutter used in the above mentioned Japanese Unexamined Patent Application Publication No. 2001-339672 is no longer needed. Also, since the LED light sources 132R, 132G, and 132B can acquire the stable emitting state immediately after being turned on, it is possible to begin capturing at once. Further, the time needed to operate the shutter can be shortened. Thus, the adjustment time can be further shortened.

Further, according to the front projection type multi-projection display 100 of the first exemplary embodiment, since the LED light sources 132R, 132G, and 132B are used as the solid-state light source, in addition to having a stable emitting state, the front projection type multi-projection display also has a sufficient brightness and color-rendering property.

In the front projection type multi-projection display 100 according to the first exemplary embodiment, the image-capturing device 140 changes the capturing range S. Therefore, it is possible to capture images with a wide capturing range and a high magnification and to capture efficiently the projection image in various capturing modes.

It is possible to obtain the information concerning the positional relation of the front projection type multi-projection display 100 with respect to the screen SCR. As a result it is possible to dispose the front projection type multi-projection display 100 in an appropriate position with respect to the screen SCR.

The capturing range S is changed by varying the position or orientation of the image-capturing device 140 or by varying the construction of an optical system, such as lens in the image-capturing device 140.

In this case, the image-capturing device 140 may further have a zoom-function and an auto-focus function. Therefore, since it is possible to change the capturing range S or the magnifications with the zoom-function, the degree of freedom or flexibility of capturing is enhanced. Further, since the focus is automatically adjusted with the auto-focus function, the convenience is greatly enhanced.

In the front projection type multi-projection display 100 according to the first exemplary embodiment, since the image-capturing device 140 can capture the entire screen SCR, it is possible to enhance the color balance and brightness balance in the entire screen.

It is possible to obtain the information concerning the positional relation of the front projection type multi-projection display 100 with respect to the screen SCR. As a result it is possible to dispose the front projection type multi-projection display 100 in an appropriate position with respect to the screen SCR.

In the front projection type multi-projection display 100 according to the first exemplary embodiment, the unit image information correcting unit 150 may correct unit image information based on the result of capturing the adjusting unit images which are projected by each of the projector units 130.

The unit image information correcting unit 150 may correct unit image information based on the result of capturing a general image. However, in the present exemplary embodiment, by correcting unit image information based on the result of capturing the adjusting unit images, it is possible to correct more accurately and rapidly.

As the adjusting unit image, various unit images suitable to correct the unit image information, such as a beta image of white or monochrome, a lattice shape of monochrome, may be used.

In this case, the adjusting image information may be stored in the adjusting image information storing unit 122 in advance and to generate the adjusting unit images by the unit image information generating unit 120 using the adjusting image information at the time of the adjustment operation. Further, the adjusting unit image information may be stored in the adjusting image information storing unit 122 in advance and at the time of the adjustment operation, the adjusting unit image information may be used as it is.

Further, every time the adjustment operation is performed, the adjusting image information may be inputted in the adjusting image information storing unit 122 (by a DVD or the like) and the unit image information generating unit 120 may generate the adjusting unit image information using the adjusting image information. Further, every time the adjustment operation is performed, the adjusting unit image information may be directly inputted in the adjusting image information storing unit 122.

In the front projection type multi-projection display 100 according to the first exemplary embodiment, the unit image information correcting unit 150 has a function of correcting the shapes, the positions and/or the inclinations of the unit images to be projected by the respective projector units 130. For this reason, the shapes, the positions and/or the inclinations between the projection images from the respective projector units 130 become proper. Thus it is possible to highly match the projection images from the respective projector units 130.

In the front projection type multi-projection display 100 according to the first exemplary embodiment, the unit image information correcting unit 150 has another function of correcting the brightness and/or colors of the unit images to be projected by the respective projector units 130. For this reason, the brightness and/or colors between the projection images from the respective projector units 130 become proper. Thus it is possible to highly match the projection images from the respective projector units 130.

In the front projection type multi-projection display 100 according to the first exemplary embodiment, the unit image information correcting unit 150 has a function of correcting the brightness and/or colors for every pixel in a plurality of projector units 130, 130, 130, 130. Accordingly, since the matching between the projection images from the respective projector units 130 is enhanced, it is possible to project the image true to the original image information to the screen SCR.

In the front projection type multi-projection display 100 according to the first exemplary embodiment, the unit image information correcting unit 150 has another function of correcting the brightness and/or colors of the unit image for every pixel in the respective projector units 130 by comparing all of the adjusting images formed by a plurality of adjusting unit images projected by the plurality of projector units 130, 130, 130, 130 with the original adjusting image.

In the front projection type multi-projection display 100 according to the first exemplary embodiment, the unit image information correcting unit 150 corrects the unit image information by using a correction parameter determined based on the captured result. Therefore, after determining the correction parameter based on the captured result, it is possible to correct easily the unit image information by using the determined correction parameter.

The front projection type multi-projection display 100 according to the first exemplary embodiment may include the correction parameter storing unit 152 to store the correction parameter. Therefore, it is possible to reduce the necessary storage capacity, compared with the case of storing the captured results and to reduce the calculation amount when correcting the unit image information.

The front projection type multi-projection display 100 according to the first exemplary embodiment may include an automatic correction parameter acquiring device (see FIGS. 3-5) to acquire automatically the correction parameter by capturing the adjusting image in certain circumstances. For example, when the re-determination (re-acquisition) of the correction parameter is required (for example, when three months have lapsed after re-acquisition), the automatic correction parameter acquiring device automatically operates to re-acquire the correction parameter. Further, the automatic correction parameter acquiring device automatically operates at a regularly scheduled time everyday (for example, at 4 a.m.) to re-acquire the correction parameter. Accordingly, it is possible to maintain uniformly the image quality without bothering a user to enhance the convenience.

Further, even though the property of the LED light source 132R, 132G, and 132B or the liquid crystal device 134R, 134G, and 134B varies with response to the variation over time, it is possible to obtain automatically the correction parameter corresponding to the variation of property. Therefore, the deterioration of the image quality due to the variation over time can be reduced or prevented.

The front projection type multi-projection display 100 according to the first exemplary embodiment further has an optical correcting device 154 for correcting the position and/or orientation of optical elements in the front projection type multi-projection display 100. Therefore, after correcting the position and/or orientation of the optical elements, the uniform image quality can be obtained. Since this correction is optically performed, the image quality does not deteriorate by performing the adjustment operation.

In the front projection type multi-projection display 100 according to the first exemplary embodiment, the position and/or orientation of the optical elements is optically corrected, the capturing operation is performed again by using the image-capturing device 140, and then the correction parameters may be determined based on the captured result. According to the above operation, after rough correction is optically performed, detail correction is electronically performed. Therefore, it is possible to reduce the deterioration of the image quality that is generated when correcting the unit image information by the unit image information correcting unit 150.

The front projection type multi-projection display 100 further has an automatic optical element correcting device (not shown) to automatically correct the position and/or orientation of the optical elements by capturing an adjusting image in certain circumstances. Therefore, when correction of the optical elements is required (for example, when three months have lapsed after re-acquisition), or at a regularly scheduled time everyday (for example, at 4 a.m.), the automatic optical element correcting device automatically operates to correct the position and/or orientation of the optical elements. Accordingly, it is possible to maintain uniformly the image quality without bothering a user to enhance the convenience.

FIGS. 6(i) to 12C are schematics showing advantages of the front projection type multi-projection display according to the first exemplary embodiment.

With reference to FIGS. 3 to 12C, how the front projection type multi-projection display 100 according to the first exemplary embodiment may correct the shapes, the positions and/or the inclinations between the projection images from the respective projector units 130 will be described. Further, how the brightness and/or colors between the projection images from the respective projector units 130 may be corrected will be described.

Display State Before Correcting

A display state before correcting will be described.

Referring to FIG. 3, if original image information A is inputted from the video signal receiving unit 160 to the unit image information generating unit 120, the unit image information generating unit 120 generates unit image information $A_1$ to $A_n$ based on original image information A. The respective projector units 130 project the unit images corresponding to unit image information $A_1$ to $A_n$ onto the screen SCR. Therefore, on the screen SCR, the projection images according to the respective unit images from the respective projector units 130 are projected. In this situation, since the front projection type multi-projection display 100 is in a state before correcting, the distorted projection images ($I_{a0}$, $I_{b0}$, $I_{c0}$, $I_{d0}$) as shown in FIG. 6(i) are projected.

First Adjustment Operation

An adjustment operation to the shapes, the positions and/or the inclinations of the unit images by the optical correcting unit 154.

The first adjustment operation will be described.

Referring to FIG. 4, if adjusting image information B from the adjusting image information storing unit 122 is input to the unit image information generating unit 120, the unit image information generating unit 120 generates adjusting unit image information $B_1$ to $B_n$ based on adjusting image information B. The respective projector units 130 project the unit images corresponding to adjusting unit image information $B_1$ to $B_n$ onto the screen SCR. In this situation, since the front projection type multi-projection display 100 is in a state before correcting, similar to the above description, since the front projection type multi-projection display 100 is in a state before correcting, the distorted projection images ($I_{a0}$, $I_{b0}$, $I_{c0}$, $I_{d0}$) as shown in FIG. 6(i) are projected, similar to the above.

Next, with the image-capturing element 142 of the image-capturing device 140, predetermined regions of the respective projection images ($I_{a0}$, $I_{b0}$, $I_{c0}$, $I_{d0}$) relating to the adjusting images shown in FIG. 6(i) are captured. And then, the optical correcting device 154 optically corrects the position and/or orientation of the housing of the respective projector units 130 based on the captured result. Moreover, in an exemplary aspect of the present invention, instead of the housing of the projector units 130, the position and/or orientation of the projection lens 138 of each of the projector units 130 may be optically corrected.

Figure 6:
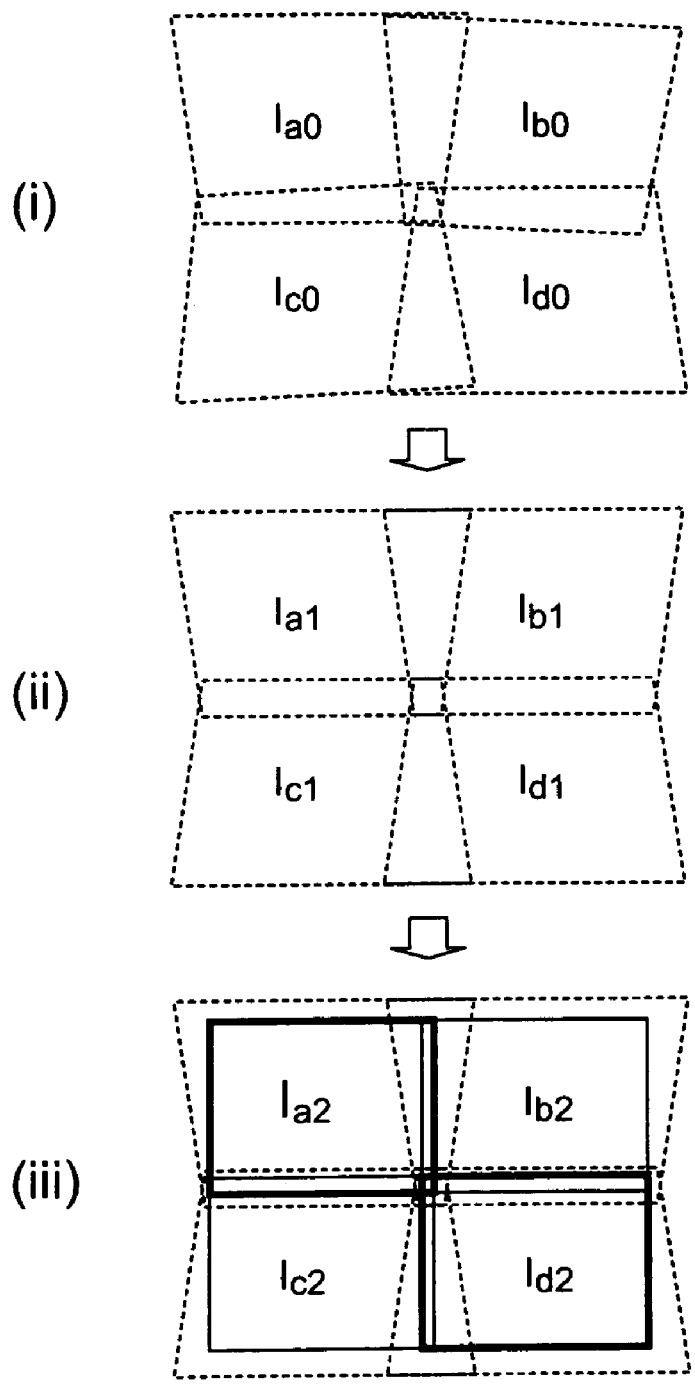

If adjusting image information B from the adjusting image information storing unit 122 is inputted to the unit image information generating unit 120 again, the respective projector units 130 project the unit images corresponding to adjusting unit image information $B_1$ to $B_n$ onto the screen SCR. In this situation, however, the position and/or orientation of the housing of the respective projector units 130 are being corrected based on the previous captured result in the front projection type multi-projection display 100. Thus, on the screen SCR, as shown in FIG. 6(ii), the projection images ($I_{a1}$, $I_{b1}$, $I_{c1}$, $I_{d1}$) having reduced distortion are projected.

Second Adjustment Operation

An adjustment operation to the shapes, the positions and/or the inclinations of the unit images by the unit image information correcting unit 150.

The second adjustment operation will be described.

Next, with the image-capturing element 142 of the image-capturing device 140, the respective projection images ($I_{a1}$, $I_{b1}$, $I_{c1}$, $I_{d1}$) according to the adjusting images shown in FIG. 6(ii) are captured. Then, based on the captured result, the unit image information correcting unit 150 determines the correction parameters to be used when unit image information is corrected. Subsequently, the determined correction parameters are stored in the correction parameter storing unit 152. Then, based on the correction parameters, a plurality of unit image information are generated from original image information.

Thus, if original image information A is input from the video signal receiving unit 160 to the unit image information generating unit 120, the unit image information generating unit 120 generates unit image information based on original image information A. In this situation, since unit image information is corrected by the correction parameters, unit image information $A_1^*$ to $A_n^*$ are generated. Therefore, the respective projector units 130 project the unit images corresponding to unit image information $A_1^*$ to $A_n^*$ onto the screen SCR. In this situation, since the front projection type multi-projection display 100 is already adjusted, as shown in FIG. 6(iii), the projection images ($I_{a2}$, $I_{b2}$, $I_{c2}$, $I_{d2}$) from the respective projector units 130 are aligned precisely.

Figure 8:
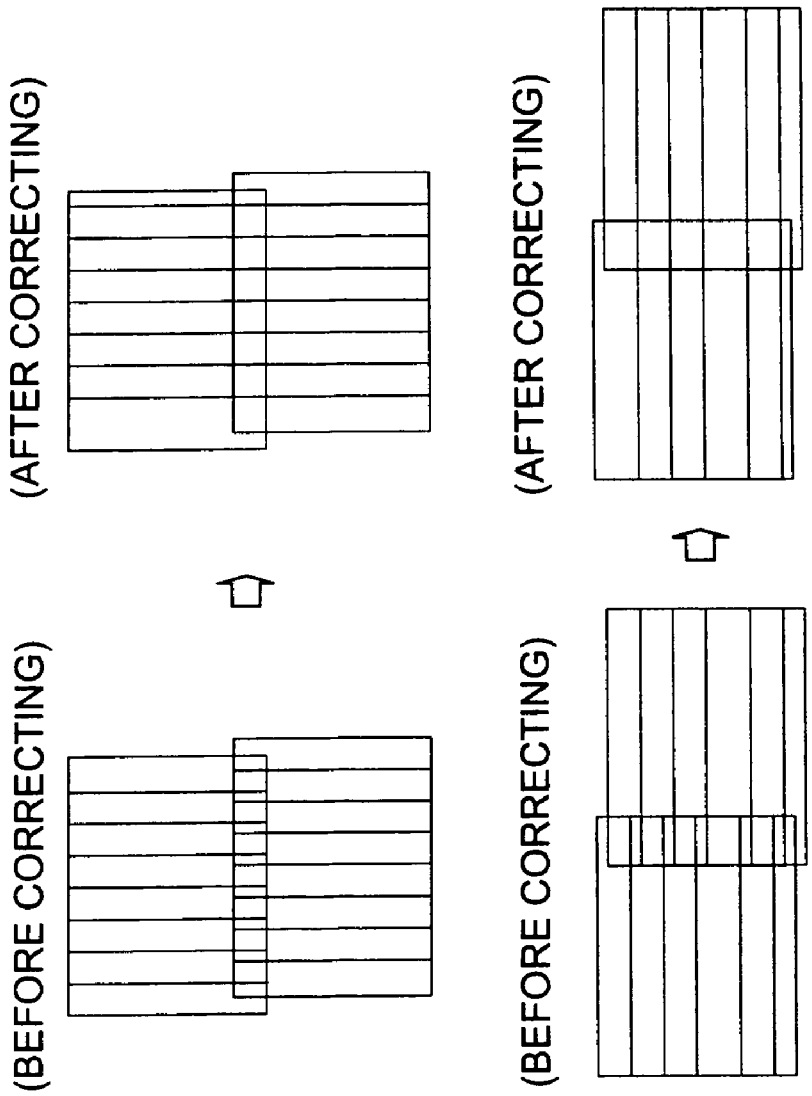
FIG. 8 is a schematic illustrating advantages of the front projection type multi-projection display according to the first exemplary embodiment.

Moreover, in the first adjustment operation and the second adjustment operation, for example, as shown in FIG. 7 (a case in which the inclinations between the respective unit images projected exist) or FIG. 8 (a case in which the inclinations between the respective unit images projected do not exist), the correction may be performed such that reference lines of the adjusting images in adjacent two projector units comply with each other, or the operation may be executed such that the reference line of the adjusting image in one projector unit 130 is captured.

In both cases, it is needed to turn on only the light source in adjacent two projector units or it is needed to turn on only the light source in one projector unit.

However, according to the front projection type multi-projection display 100 of the first exemplary embodiment, since the LED light sources 132R, 132G, and 132B which can acquire the stable emitting state immediately after being turned on are used as the light source of the respective projector units 130, it is possible to drastically shorten the time required for the above-mentioned adjustment operation.

Third Adjustment Operation

An adjustment operation to brightness and/or colors of the unit images by the unit image information correcting unit 150.

The third adjustment operation will be described. For the purpose of simple description, an adjustment of an overlapped region in adjacent two projector units (temporarily, referred to as $PJU_a$ and $PJU_b$) will be described.

Figure 9:
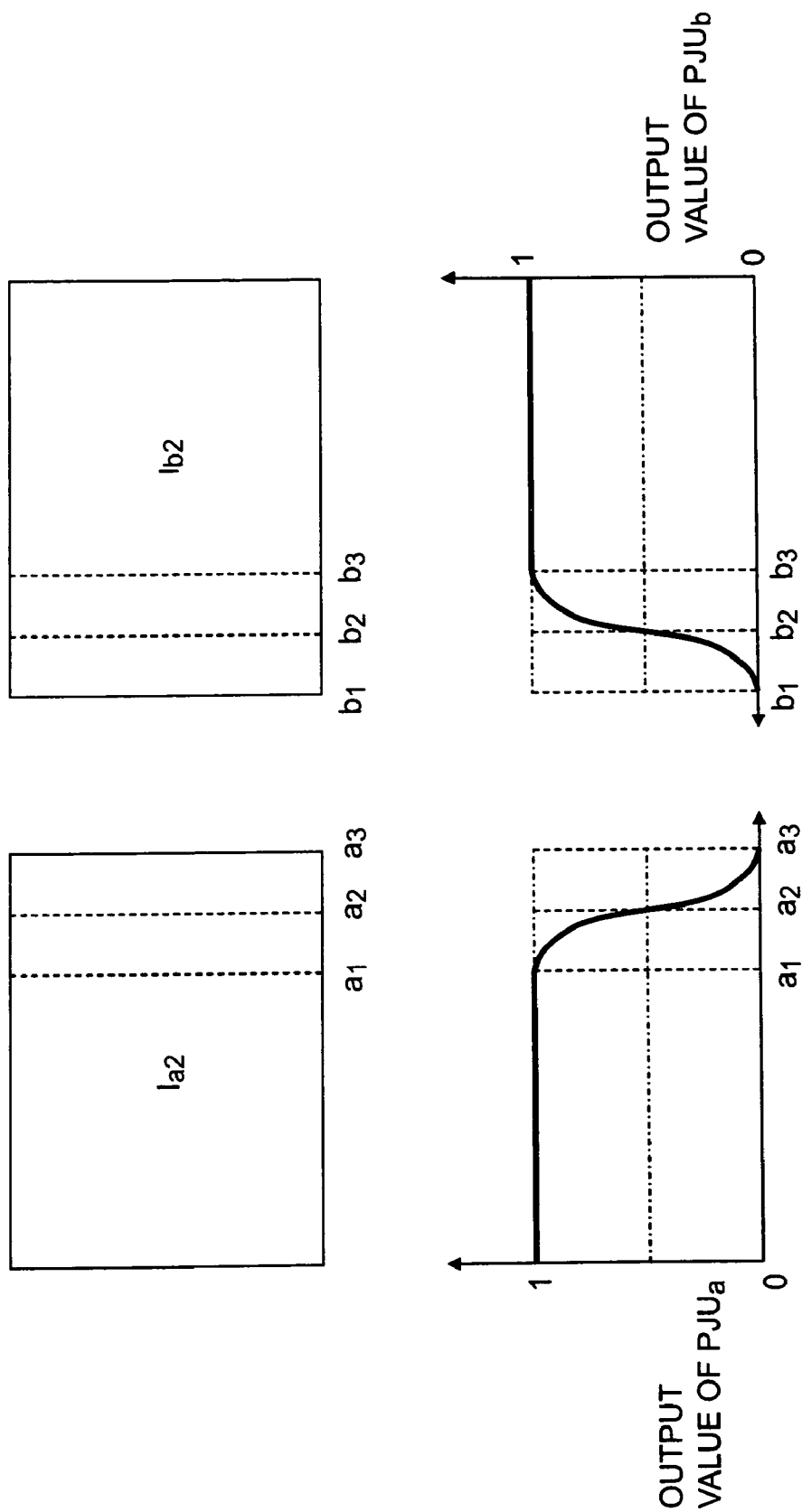
FIG. 9 is a schematic illustrating advantages of the front projection type multi-projection display according to the first exemplary embodiment.
Figure 10:
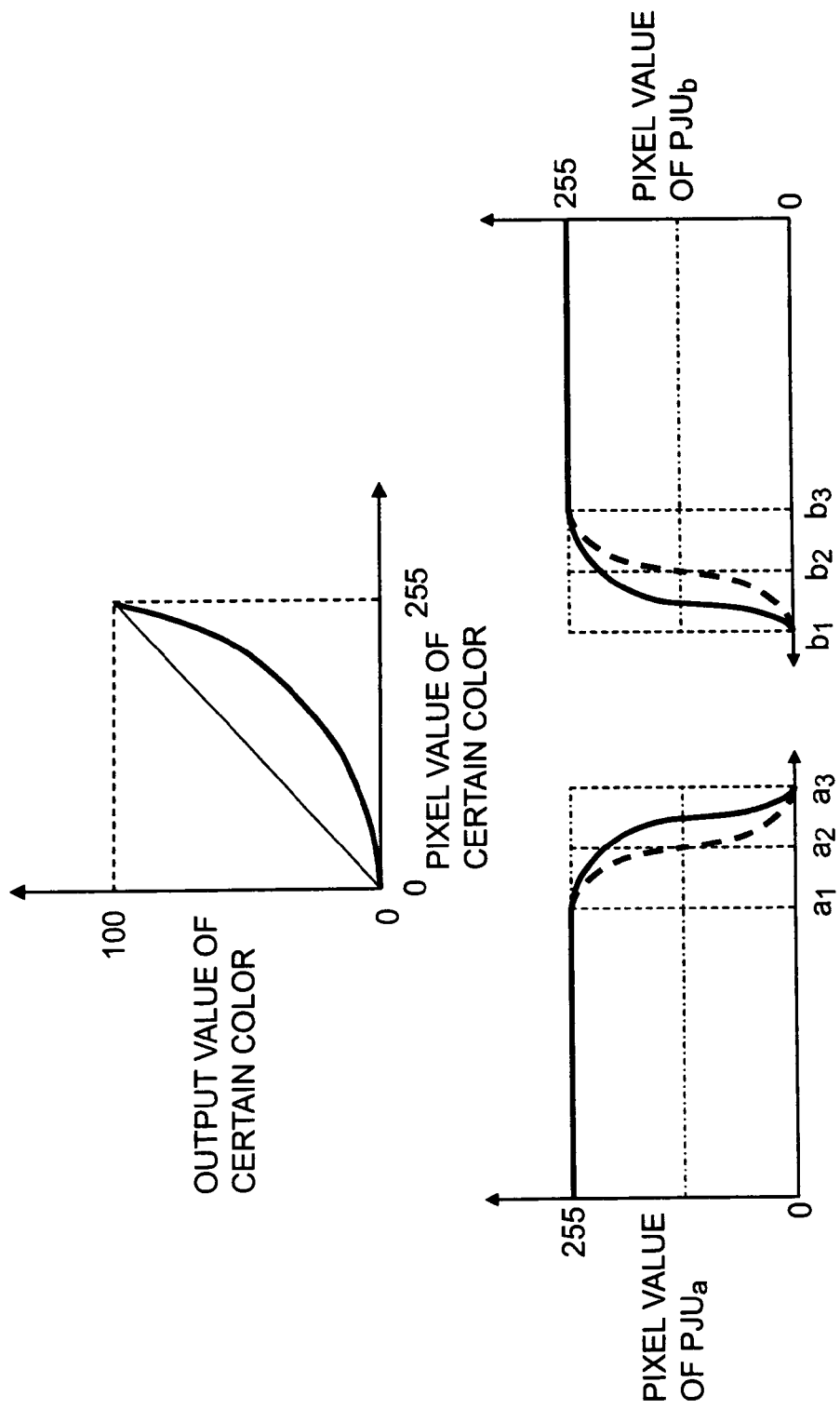
FIG. 10 is a schematic illustrating advantages of the front projection type multi-projection display according to the first exemplary embodiment.
Figure 11:
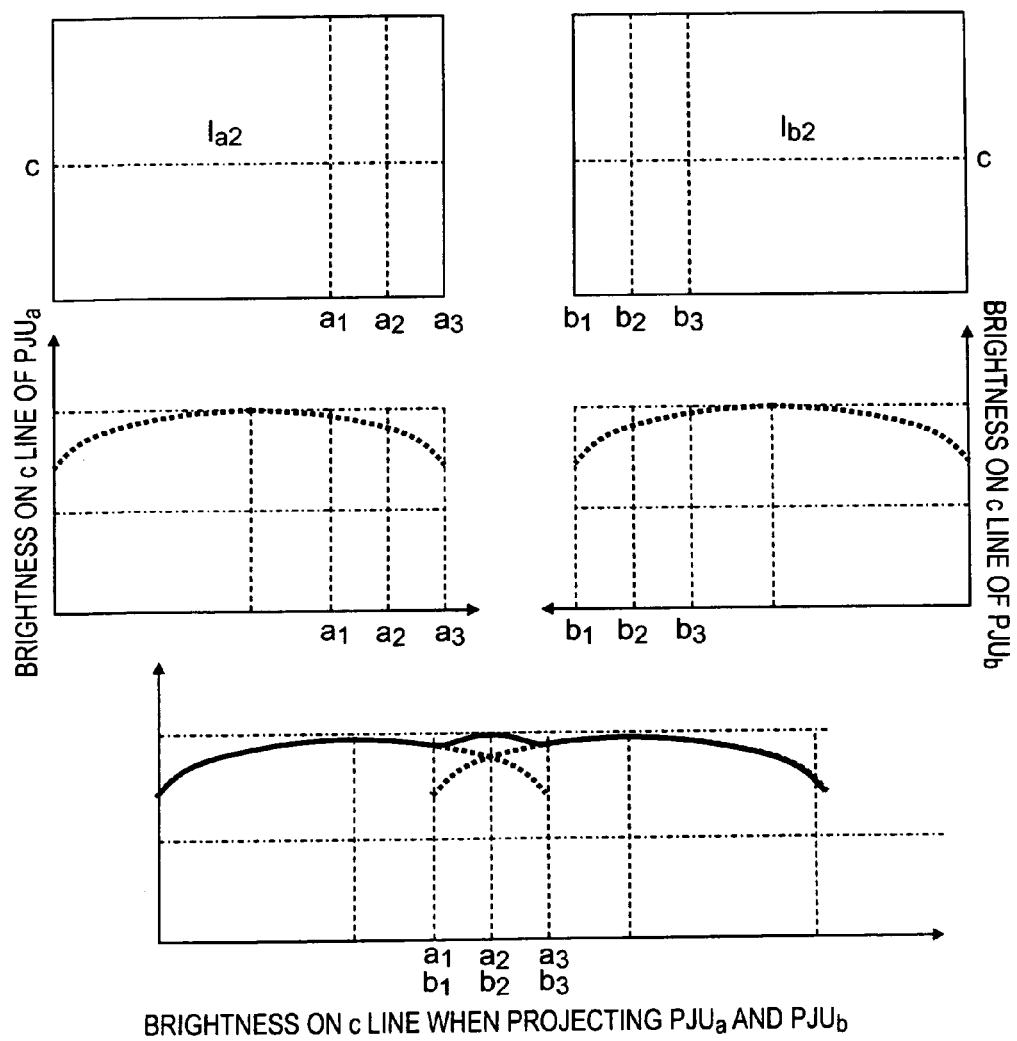
FIG. 11 is a schematic illustrating advantages of the front projection type multi-projection display according to the first exemplary embodiment.

First, as shown in FIG. 9, a weight function in the overlapped region is added to a pixel value of unit image information such that the projection images ($I_{a2}$, $I_{b2}$) from the adjacent projector units $PJU_a$ and $PJU_b$ are connected smoothly to each other. In this situation, as the weight function, as shown in FIG. 10, a weight function taking γ correction into consideration is used. By doing so, as shown in FIG. 11, the projection images from the adjacent projector units $PJU_a$ and $PJU_b$ are smoothly connected to each other. As a result, as shown in FIG. 12, the projection images from the adjacent two projector units $PJU_a$ and $PJU_b$ are favorably synthesized and smoothly connected to each other.

In the front projection type multi-projection display 100 according to the first exemplary embodiment, when two unit image information is generated based on original image information relating to an original image (FIG. 12A), the unit images (FIG. 12B) are generated such that they are smoothly connected to each other on the screen SCR (FIG. 12C). Thus, the projection images from the adjacent two projector units $PJU_a$ and $PJU_b$ are favorably synthesized and smoothly connected to each other.

Second Exemplary Embodiment

Figure 13A:
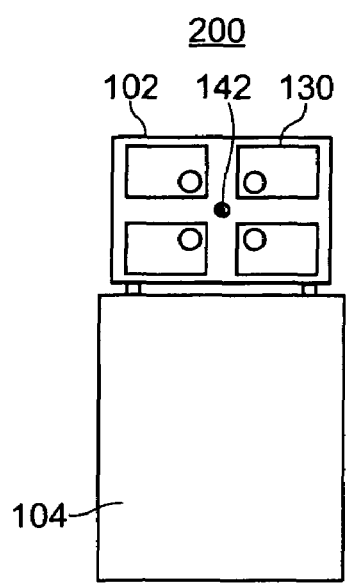
FIGS. 13A-13C are schematics showing a construction of a front projection type multi-projection display according to a second exemplary embodiment.
Figure 13B:
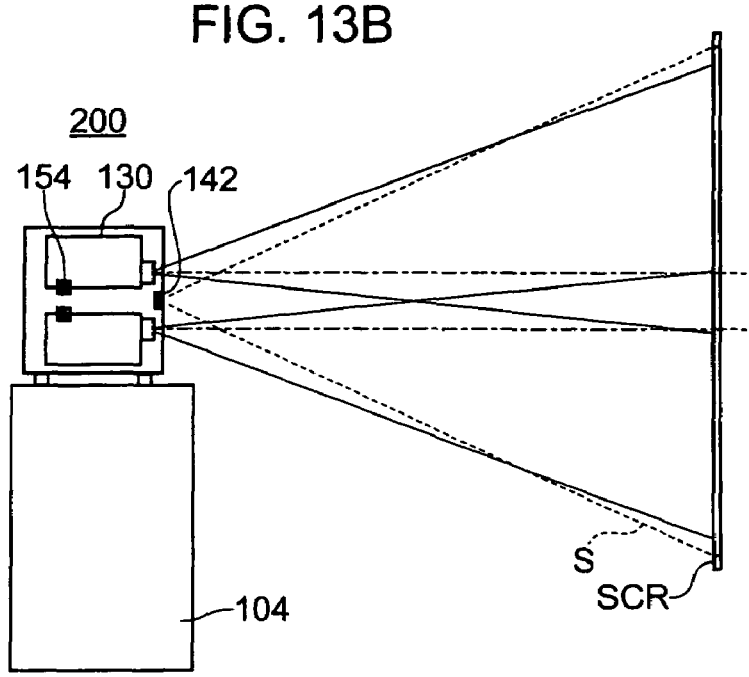
Figure 13C:
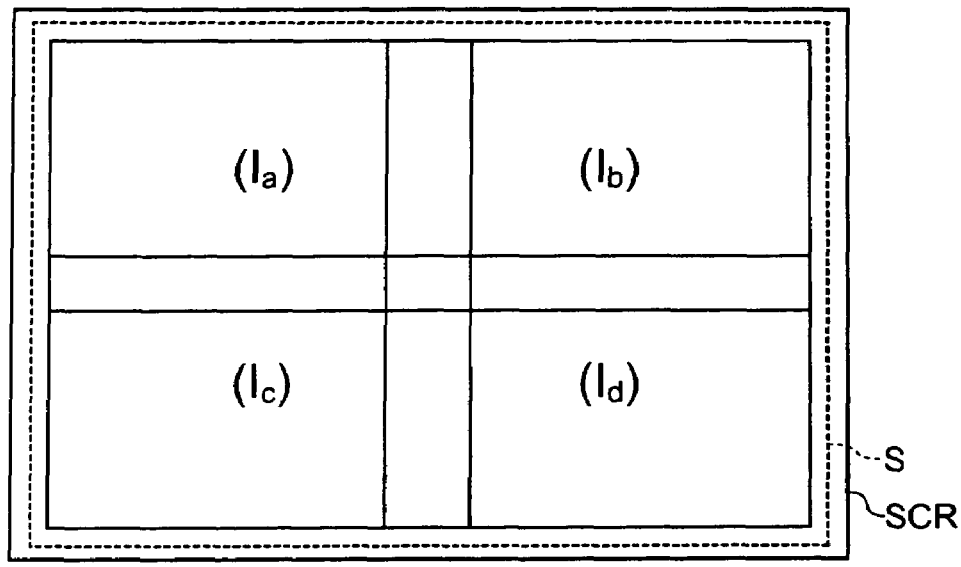
Figure 14:
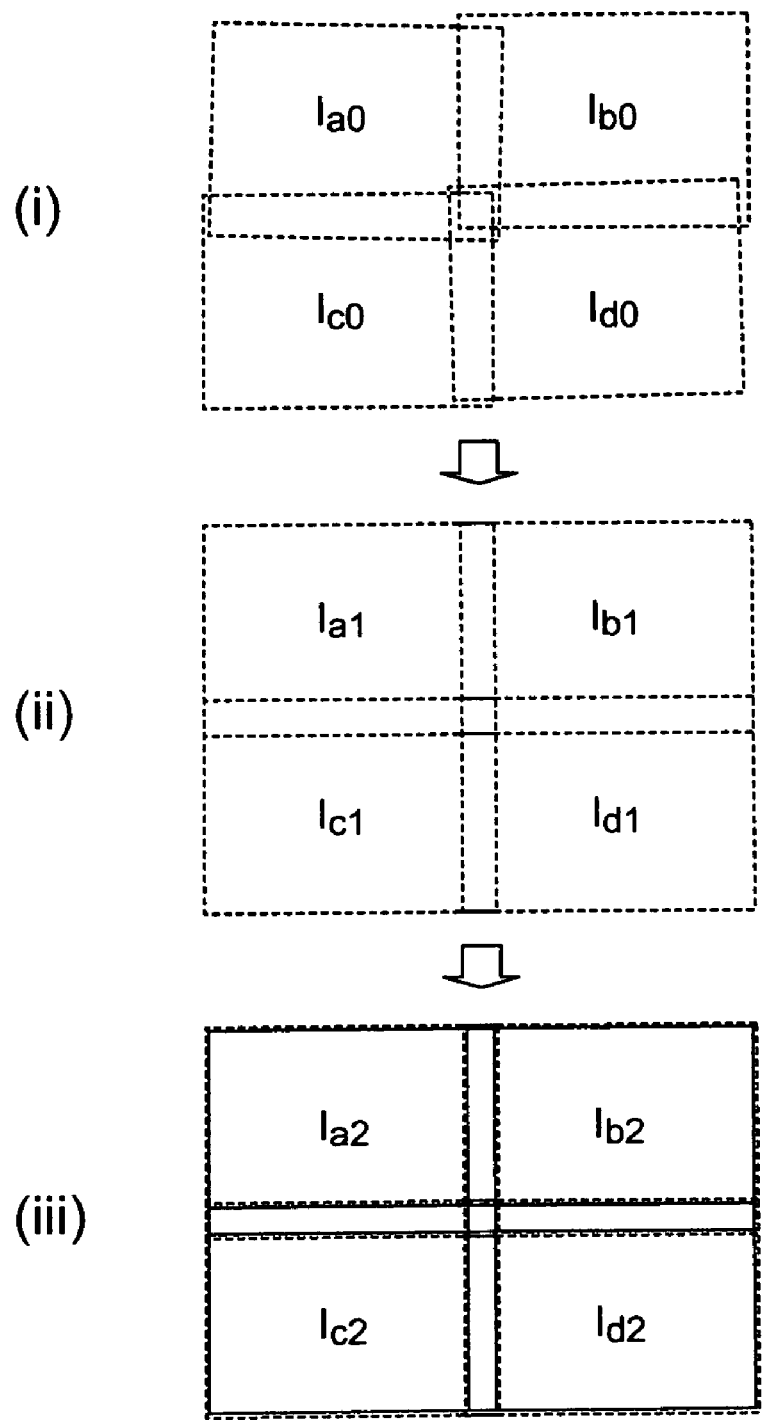

FIGS. 13A-13C are schematics showing a construction of a front projection type multi-projection display according to a second exemplary embodiment. FIGS. 14(i)-14(iii) are schematics illustrating advantages of the front projection type multi-projection display according to the second exemplary embodiment.

The front projection type multi-projection display 200 according to second exemplary embodiment is constructed such that an optical axis of a projection light flux from each of the projector units 130 is orthogonal to the screen surface of the screen SCR, as shown in FIG. 13.

For this reason, the unit images from the respective projector units 130 do not have trapezoidal distortion. As a result, advantages in the front projection type multi-projection display 200 according to the second exemplary embodiment are as shown in FIG. 14, unlike FIG. 6 showing advantages in the front projection type multi-projection display 100 according to the first exemplary embodiment.

However, in the front projection type multi-projection display 200 according to the second exemplary embodiment, since the image-capturing device 140 is provided inside (at an inner position immediate to a front of) the housing 102, it is possible to obtain the same advantages as those of the front projection type multi-projection display 100 according to the first exemplary embodiment.

Third Exemplary Embodiment

Figure 15:
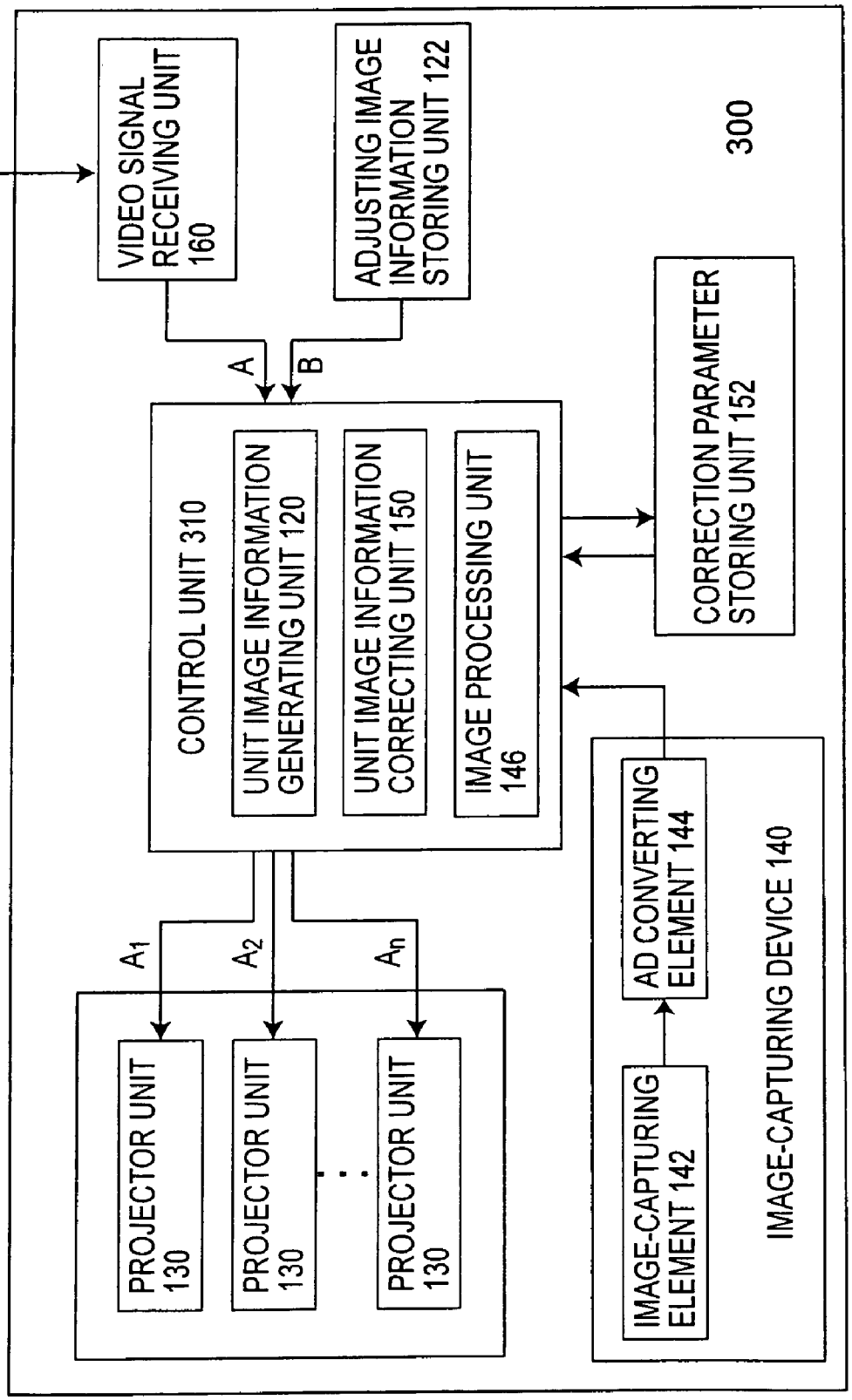
FIG. 15 is a schematic showing an outline of a front projection type multi-projection display according to a third exemplary embodiment.

FIG. 15 is a schematic showing an outline of a front projection type multi-projection display according to the third exemplary embodiment. FIGS. 16A and 16B are schematics illustrating advantages of the front projection type multi-projection display according to the third exemplary embodiment. FIG. 16A is a schematic showing advantages in the case in which the unit image has trapezoidal distortion, and FIG. 16B is a schematic showing advantages in the case in which the unit image does not have trapezoidal distortion.

As shown in FIG. 15, the front projection type multi-projection display 300 according to the third exemplary embodiment has a construction of a control unit different from the front projection type multi-projection display 100 according to the first exemplary embodiment. That is, in the front projection type multi-projection display 300 according to the third exemplary embodiment, the control unit 310 has a construction excluding the optical correcting device 154 from the construction of the control unit 110 in the front projection type multi-projection display 100 according to the first embodiment.

However, since the front projection type multi-projection display 300 according to the third exemplary embodiment has an image-capturing device 140 which is provided inside (at an inner position immediate to a front of) a housing of the front projection type multi-projection display, it is possible to obtain the same advantages as those of the front projection type multi-projection display 100 according to the first exemplary embodiment.

Further, the front projection type multi-projection display 300 according to the third exemplary embodiment can correct the unit images without using the optical correcting device. Thus, it is possible to simplify the structure. Further, it has an advantage in that it is possible to attain cost reduction and reliability enhancement. In particular, the front projection type multi-projection display 300 can be suitably used as a stationary front projection type multi-projection display in which the positional relation to the screen is fixed.

Moreover, in the front projection type multi-projection display 300 according to the third exemplary embodiment, the unit image information is corrected only by the working of the unit image information correcting unit 150, without using the optical correcting device. Thus, hereinafter, the adjustment method will be described.

Display State Before Correcting

Referring to FIG. 15, if original image information A is input from a video signal receiving unit 160 to a unit image information generating unit 120, the unit image information generating unit 120 generates unit image information $A_1$ to $A_n$ based on the original image information A. The respective projector units 130 project the unit images corresponding to unit image information $A_1$ to $A_n$ onto the screen SCR. Therefore, on the screen SCR, the projection images corresponding to the respective unit images from the respective projector units 130 are projected. In this situation, since the front projection type multi-projection display 300 is in a state before correcting, the distorted projection images ($I_{a0}$, $I_{b0}$, $I_{c0}$, $I_{d0}$) as shown in FIGS. 16A(i) and 16B(i) are projected.

First Adjustment Operation

An adjustment operation on the shapes, the positions and/or the inclinations of the unit images by the unit image information correcting unit 150.

The first adjustment operation will be described.

Next, if adjusting image information B is input from the adjusting image information storing unit 122 to the unit image information generating unit 120, the unit image information generating unit 120 generates adjusting unit image information $B_1$ to $B_n$ (not shown) based on adjusting image information B. The respective projector units 130 project the unit images corresponding to adjusting unit image information $B_1$ to $B_n$ onto the screen SCR. In this situation, since the front projection type multi-projection display 300 is in a state before correcting, similarly to the above description, the distorted projection images ($I_{a0}$, $I_{b0}$, $I_{c0}$, $I_{d0}$) as shown in FIGS. 16A(i) and 16B(i) are projected.

Next, with an image-capturing element 142 of the image-capturing device 140, the respective projection images ($I_{a0}$, $I_{b0}$, $I_{c0}$, $I_{d0}$) relating to the adjusting images shown in FIGS. 16A(i) and 16B(i) are captured. Then, based on the captured result, the unit image information correcting unit 150 determines the correction parameters to be used when unit image information is corrected. Subsequently, the determined correction parameters are stored in the correction parameter storing unit 152. Then, based on the correction parameters, a plurality of unit image information are generated from the original image information.

Thus, if the original image information A from the video signal receiving unit 160 is input to the unit image information generating unit 120, the unit image information generating unit 120 generates unit image information based on the original image information A. In this regard, in this situation, since unit image information is corrected by the correction parameters, unit image information $A_1^*$ to $A_n^*$ (not shown) are generated. Therefore, the respective projector units 130 project the unit images corresponding to unit image information $A_1^*$ to $A_n^*$ onto the screen SCR. In this situation, since the front projection type multi-projection display 300 is adjusted in advance, as shown in FIGS. 16A(ii) and 16B(ii), the projection images ($I_{a2}$, $I_{b2}$, $I_{c2}$, $I_{d2}$) from the respective projector units 130 are located precisely.

Second Adjustment Operation

An adjustment operation to brightness and/or colors of the unit images by the unit image information correcting unit 150.

The second adjustment operation will be described. For the purpose of simple description, an adjustment of an overlapped region in adjacent two projector units (temporarily, referred to as $PJU_a$ and $PJU_b$) will be described. Further, it will be described by using again FIGS. 9 to 12C which were used in order to explain the front projection type multi-projection display 100 according to the first exemplary embodiment.

First, as shown in FIG. 9, a weight function in the overlapped region is added to a pixel value of unit image information such that the projection images ($I_{a2}$, $I_{b2}$) from the adjacent projector units $PJU_a$ and $PJU_b$ are smoothly connected to each other. In this situation, as the weight function, as shown in FIG. 10, a weight function taking γ correction into consideration is used. By doing so, as shown in FIG. 11, the projection images from the adjacent projector units $PJU_a$ and $PJU_b$ are smoothly connected to each other. As a result, as shown in FIG. 12, the projection images from the adjacent two projector units $PJU_a$ and $PJU_b$ are satisfactorily synthesized and smoothly connected to each other.

In the front projection type multi-projection display 300 according to the third exemplary embodiment, when two unit image information is generated based on the original image information relating to the original image (FIG. 12A), the unit images (FIG. 12B) are generated such that they are smoothly connected to each other on the screen (FIG. 12C) SCR. Thus, the projection images from the adjacent two projector units $PJU_a$ and $PJU_b$ are satisfactorily synthesized and smoothly connected to each other.

Fourth Exemplary Embodiment

Figure 18:
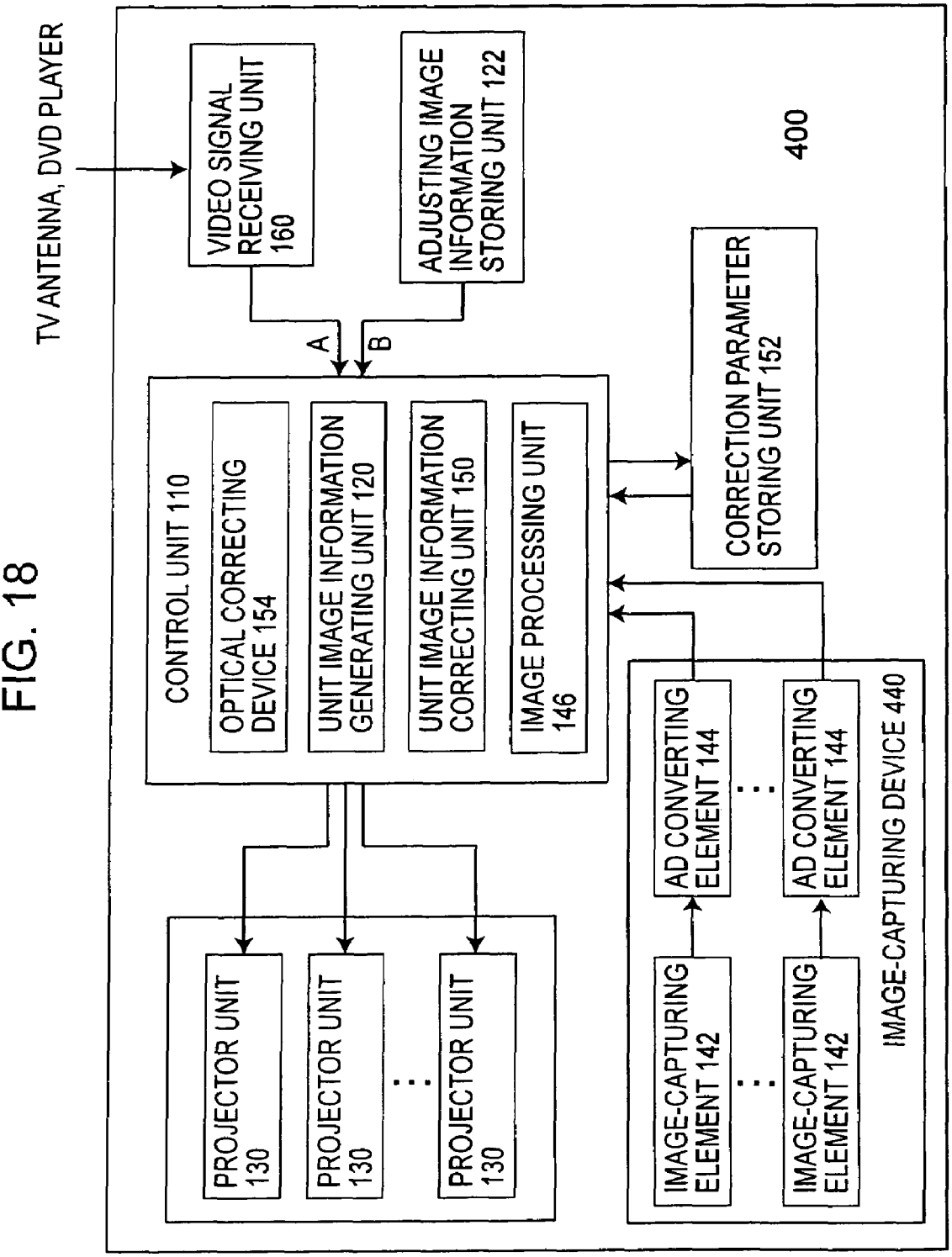
FIG. 18 is a schematic illustrating an outline of the front projection type multi-projection display according to the fourth exemplary embodiment.

FIG. 17 is a schematic showing a construction of a front projection type multi-projection display according to a fourth exemplary embodiment. FIG. 17A is a front view thereof, FIG. 17B is a cross-sectional view as viewed from a side, and FIG. 17C is a view showing a projection image projected onto the screen. FIG. 18 is a schematic illustrating an outline of the front projection type multi-projection display according to the fourth exemplary embodiment. Further, reference characters $S_1$ and $S_2$ in FIG. 17 show capturing ranges of the image-capturing element 142, respectively.

In the front projection type multi-projection display 400 according to the fourth exemplary embodiment, as shown in FIGS. 17 and 18, the image-capturing device 440 has a plurality of image-capturing elements 142 which capture a predetermined area of the projection image projected onto the screen SCR. Therefore, in the front projection type multi-projection display 400 according to the fourth exemplary embodiment has the following advantages, in addition to the advantages of the front projection type multi-projection display 100 according to the first exemplary embodiment.

Since image-capturing element to be used can be suitably selected by a capturing object, it is possible to reduce the capturing time. Accordingly, the adjustment time is also reduced, the precision of capturing and adjustment can be enhanced.

In addition, since it is possible to reduce the capturing area for every image-capturing element, the projection image can be captured by using an inexpensive image-capturing element with the relatively low resolution. Therefore, the increase in the price of the front projection type multi-projection display can be minimized.

Fifth Exemplary Embodiment

Figure 20:
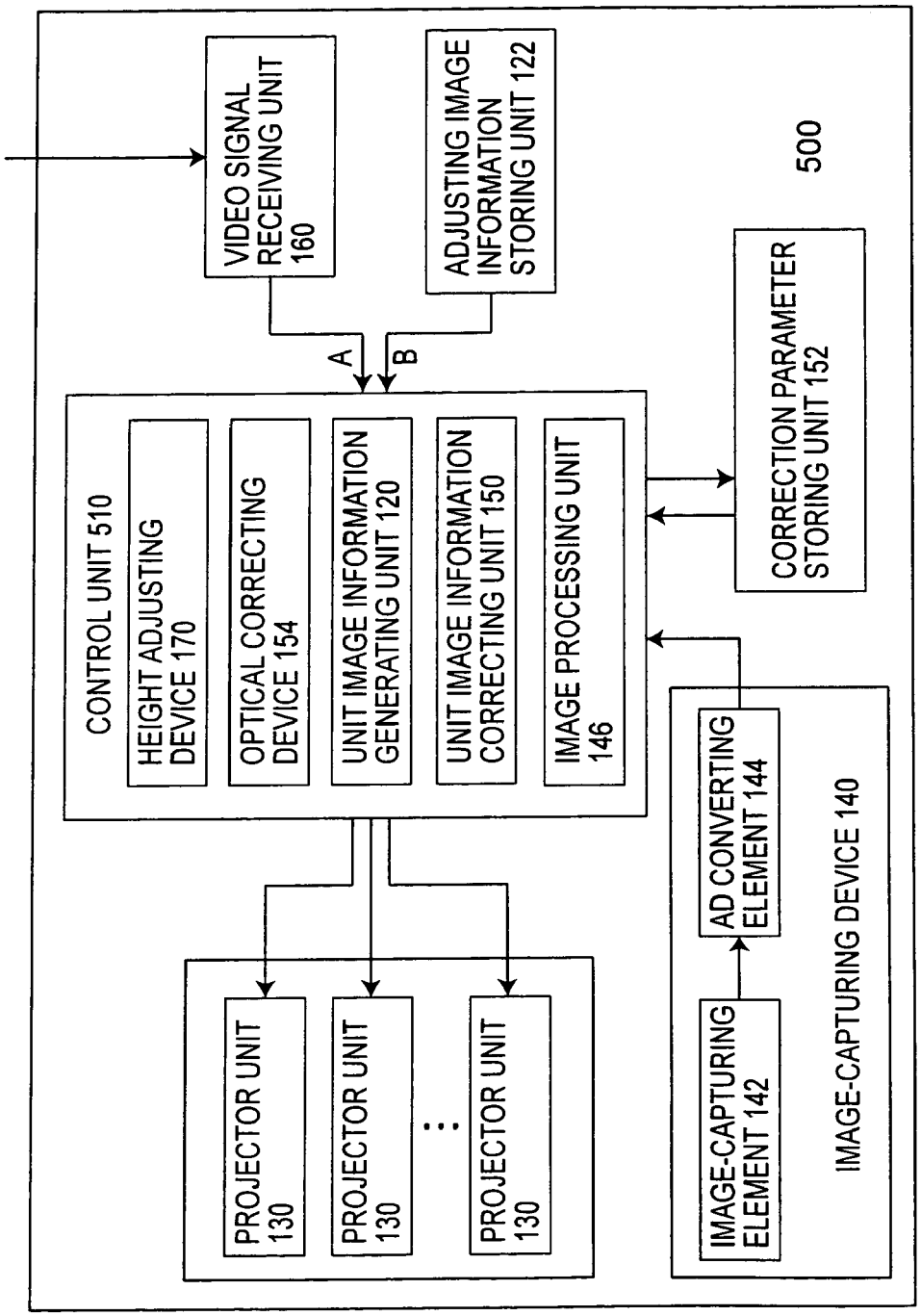
FIG. 20 is a schematic illustrating an outline of the front projection type multi-projection display according to the fifth exemplary embodiment.

FIGS. 19A-19C are schematics illustrating a construction of a front projection type multi-projection display according to a fifth exemplary embodiment. FIG. 20 is a schematic illustrating an outline of the front projection type multi-projection display according to the fifth exemplary embodiment.

As shown in FIGS. 19A-19C and 20, in the front projection type multi-projection display 500 according to the fifth exemplary embodiment, projector units 130 and an image-capturing element 142 are loaded in an up-and-down movable unit 106 which is formed so as to be movable in a vertical direction based on an output of a height adjusting device 170 in a control unit 510.

Therefore, the front projection type multi-projection display 500 according to the fifth exemplary embodiment has the following advantages, in addition to the advantages of the front projection type multi-projection display 100 according to the first exemplary embodiment.

In the case of installing the front projection type multi-projection display 500, when determined that the position of the front projection type multi-projection display 500 is lower than that of a screen SCR, based on a result captured by the image-capturing device 140, the position of the front projection type multi-projection display 500 with respect to the screen SCR can be adjusted by moving the up-and-down movable unit 106 in the vertical direction according to the output by the height adjusting device 170, without turning the orientation of the respective projector units 130 in an upper direction.

Accordingly, it is possible to accurately adjust the position of the front projection type multi-projection display 500 with respect to the screen SCR without generating a trapezoidal distortion. As a result, even when the front projection type multi-projection display 500 is newly installed, or re-installed at other positions, the image quality does not deteriorate, and the installation thereof can be carried out easily.

Sixth Exemplary Embodiment

Figure 21:
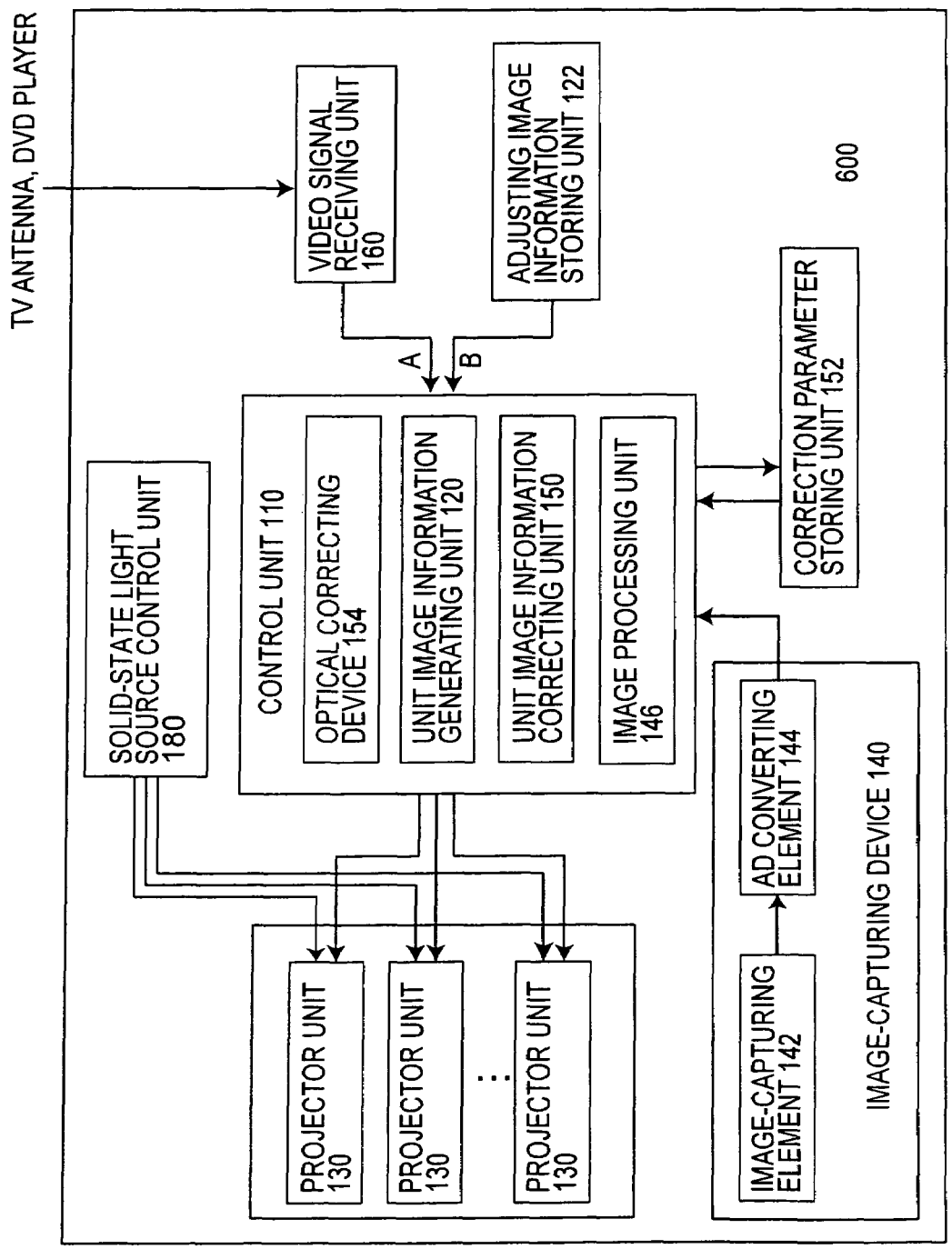
FIG. 21 is a schematic illustrating an outline of the front projection type multi-projection display according to a sixth exemplary embodiment.
Figure 23A:
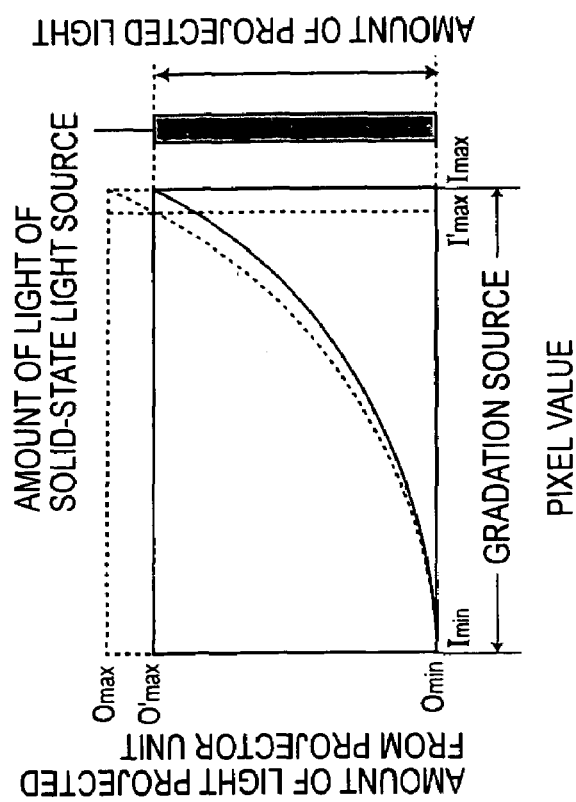
FIGS. 23A and 23B are schematics illustrating advantages of the front projection type multi-projection display according to the sixth exemplary embodiment.
Figure 23B:
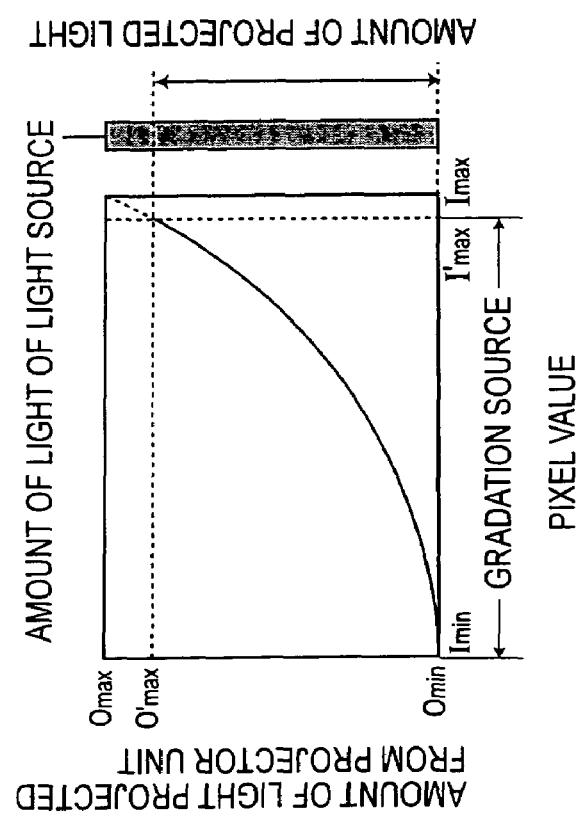

FIG. 21 is a schematic showing an outline of a front projection type multi-projection display according to a sixth exemplary embodiment. FIGS. 22A-23B are schematics illustrating advantages of the front projection type multi-projection display according to the sixth exemplary embodiment. FIG. 22A shows a case in which the highest brightness level white display is made in an entire screen of the front projection type multi-projection display according to the first exemplary embodiment. FIG. 22B shows a case in which the highest brightness level white display is made in an entire screen of the front projection type multi-projection display according to the sixth exemplary embodiment. FIG. 23A shows the brightness adjustment by a liquid crystal device in the projector unit having the highest brightness level, FIG. 23B shows the brightness adjustment by a solid-state light source control unit in the projector unit having the highest brightness level.

As shown in FIG. 21, the front projection type multi-projection display 600 according to the sixth exemplary embodiment includes the solid-state light source control unit 180 to control the amount of light emitted from the LED light sources for every projector unit 130, in addition to the construction of the front projection type multi-projection display 100 according to the first exemplary embodiment. The solid-state light source control unit 180 has a function of controlling the amount of light emitted from the LED light sources for every liquid crystal device.

For this reason, the front projection type multi-projection display 600 according to the sixth exemplary embodiment has the following advantages, in addition to the advantages in the front projection type multi-projection display 100 according to the first exemplary embodiment.

That is, according to the front projection type multi-projection display 600 of the sixth exemplary embodiment, as shown in FIG. 22B, it is possible to control separately the amount of light emitted from the LED light sources for every projector unit 130. Thus, it is possible to absorb the difference of the brightness characteristics or the color characteristics for every projector unit 130 by controlling the amount of light emitted from the LED light sources. For this reason, as shown in FIG. 23, there is no need for using the gradation source in the liquid crystal device. Thus, there is no case in which the number of effective gradations inherent in the front projection type multi-projection display is lowered or the dynamic range becomes narrow.

Further, according to the front projection type multi-projection display 600 of the sixth exemplary embodiment, it is possible to control separately the amount of light emitted from the LED light sources for every liquid crystal device. Thus, it is also possible to absorb the difference of the color characteristics for every projector unit 130 by controlling the amount of light emitted from the LED light sources.

In the front projection type multi-projection display 600 according to the sixth exemplary embodiment, as shown in FIG. 22B, in order to absorb the difference of the brightness characteristic for every projector unit 130, in the projector units (projector units projecting the unit images $I_a$, $I_b$, and $I_d$) other than the projector unit having the lowest brightness level (projector unit projecting the unit image $I_c$), the amount of light emitted from the LED light sources is lowered such that the brightness level in the projector units complies with the brightness level in the projector unit having the lowest brightness level.

In the front projection type multi-projection display 600 according to the sixth exemplary embodiment, the amount of light emitted from the LED light sources is controlled for every color light component.

In the front projection type multi-projection display 600 according to the sixth exemplary embodiment, the solid-state light source control unit 180 may separately control voltages to be supplied to the LED light sources or may separately control the emitting periods of the LED light sources, for every projector unit 130 and/or for every liquid crystal device. In any cases, it is possible to easily decrease or increase brightness of the LED light sources.

Seventh Exemplary Embodiment

Figure 24A:
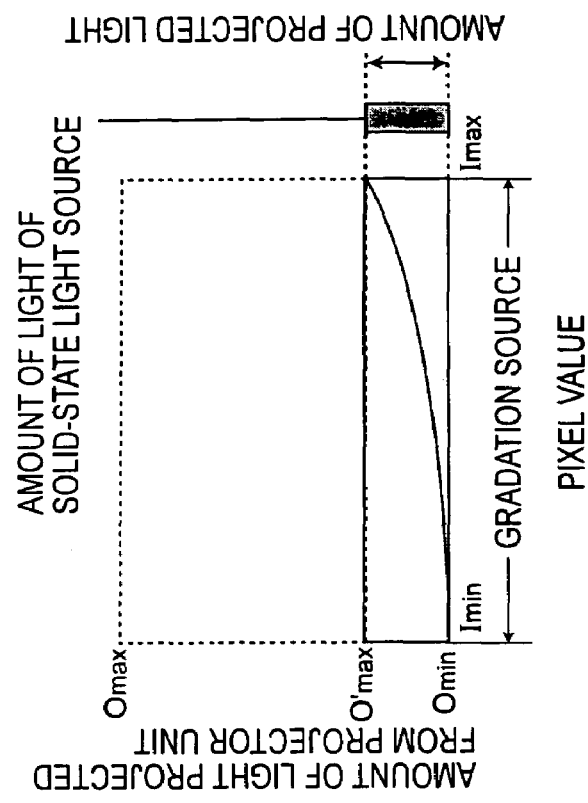
FIGS. 24A and 24B are schematics illustrating advantages of a front projection type multi-projection display according to a seventh exemplary embodiment.
Figure 24B:
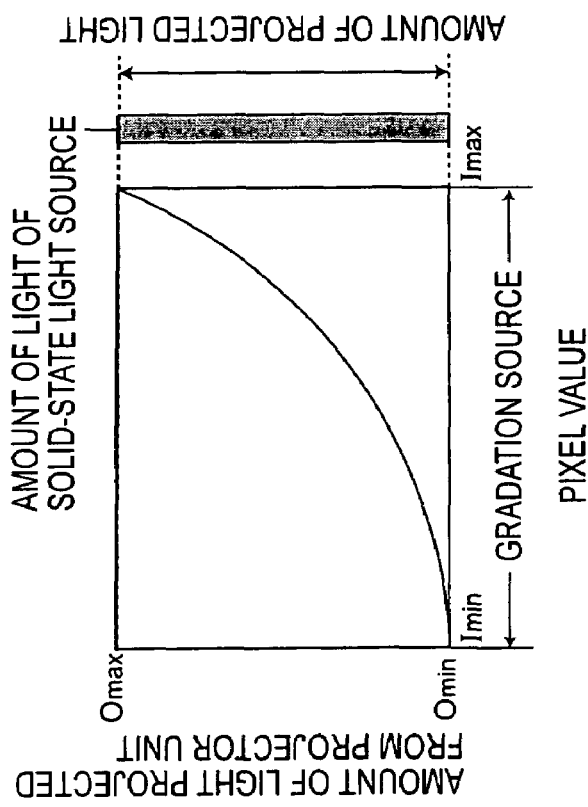

FIGS. 24A-24B are schematics illustrating advantages of a front projection type multi-projection display according to a seventh exemplary embodiment. FIG. 24A shows an amount of light projected from a projector unit that projects totally bright image. FIG. 24B shows an amount of light projected from a projector unit that projects totally dark image.

The front projection type multi-projection display 700 (not shown) according to the seventh exemplary embodiment includes the solid-state light source control unit 780 (not shown) to control the amount of light emitted from the LED light sources for every projector unit, similar to the front projection type multi-projection display 600 according to the sixth exemplary embodiment. Further, the solid-state light source control unit 780 has a function of controlling the amount of light emitted from the LED light sources for every liquid crystal device, similar to the front projection type multi-projection display 600 according to the sixth exemplary embodiment.

In the front projection type multi-projection display 700 according to the seventh exemplary embodiment, the solid-state light source control unit 780 also has a function of dynamically controlling the amount of light emitted from the LED light sources, in addition to the above-mentioned function.

For this reason, the front projection type multi-projection display 700 according to the seventh exemplary embodiment has the following advantages, in addition to the advantages in the front projection type multi-projection display 600 according to the sixth exemplary embodiment.

As shown in FIG. 24B, in the case in which a totally dark image is displayed (for example, a case in which a night scene in a movie is displayed), instead of or in addition to lowering the transmittance of the liquid crystal devices, by decreasing the amount of light emitted from the LED light sources, it is possible to make an entire screen dark. Further, as shown in FIG. 24A, in the case in which a totally bright screen is displayed (for example, a case in which an outdoor scene in the daytime in a movie is displayed), instead of or in addition to increasing the transmittance of the liquid crystal devices, by increasing the amount of light emitted from the LED light sources, it is possible to make the entire screen bright.

For this reason, it is possible to increase the number of effective gradations or the dynamic range compared to that of the related art, which results in a high image quality multi-projection display having an excellent black level.

Eighth Exemplary Embodiment

FIG. 25 is a schematic illustrating advantages of a front projection type multi-projection display according to an eighth exemplary embodiment.

The front projection type multi-projection display 800 (not shown) according to the eighth exemplary embodiment includes the solid-state light source control unit 880 (not shown) to control the amount of light emitted from the LED light sources for every projector unit and for every liquid crystal device, similar to the front projection type multi-projection display 700 according to the seventh exemplary embodiment. Further, the solid-state light source control unit 880 also has a function of dynamically controlling the amount of light emitted from the LED light sources, similar to the front projection type multi-projection display 700 according to the seventh exemplary embodiment.

In the front projection type multi-projection display 800 according to the eighth exemplary embodiment, the solid-state light source control unit 880 also has a function of dynamically controlling the amount of light emitted from the LED light sources for every projector unit, in addition to the above-mentioned function.

For this reason, the front projection type multi-projection display 800 according to the eighth exemplary embodiment has the following advantages, in addition to the advantages in the front projection type multi-projection display 700 according to the seventh exemplary embodiment.

That is, as shown in FIG. 25, in the case in which an image in which a bright screen and a dark screen exist in one screen is displayed, it is possible for the front projection type multi-projection display to exhibit the expression ability exceeding the number of effective gradation or the dynamic range inherent in the front projection type multi-projection display. In addition, it is possible to perform high image quality display.

Ninth Exemplary Embodiment

A front projection type multi-projection display 900 (not shown) according to a ninth exemplary embodiment includes the solid-state light source control unit 980 (not shown) to control the amount of light emitted from the LED light sources for every projector unit and for every liquid crystal device, similar to the front projection type multi-projection display 800 according to the eighth exemplary embodiment. Further, the solid-state light source control unit 980 also has a function of dynamically controlling the amount of light emitted from the LED light sources for every projector unit.

The front projection type multi-projection display 900 according to the ninth exemplary embodiment includes a liquid crystal device, which perform writing twice or more to one unit image information, as the liquid crystal device. Further, in the front projection type multi-projection display 900 according to the ninth exemplary embodiment, the solid-state light source control unit 980 has a function of allowing the solid-state light source to emit during one frame outside at least the first writing period of the liquid crystal devices.

Figure 26A:
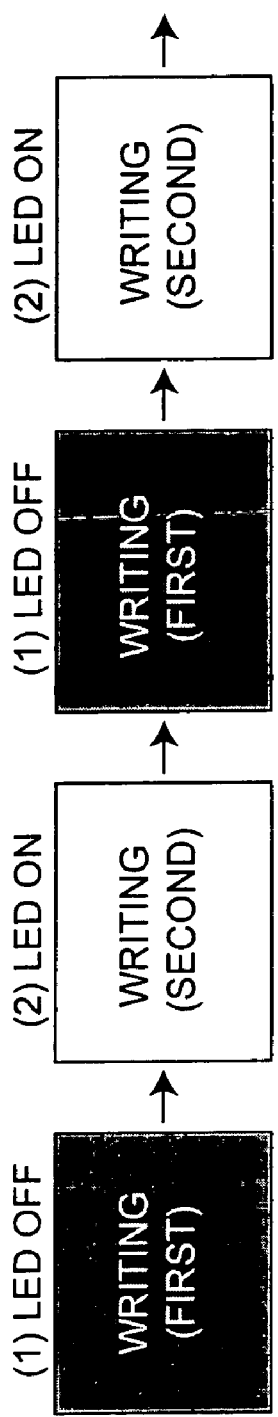
FIGS. 26A-26C are schematics illustrating operations of a front projection type multi-projection display according to a ninth exemplary embodiment.
Figure 26B:
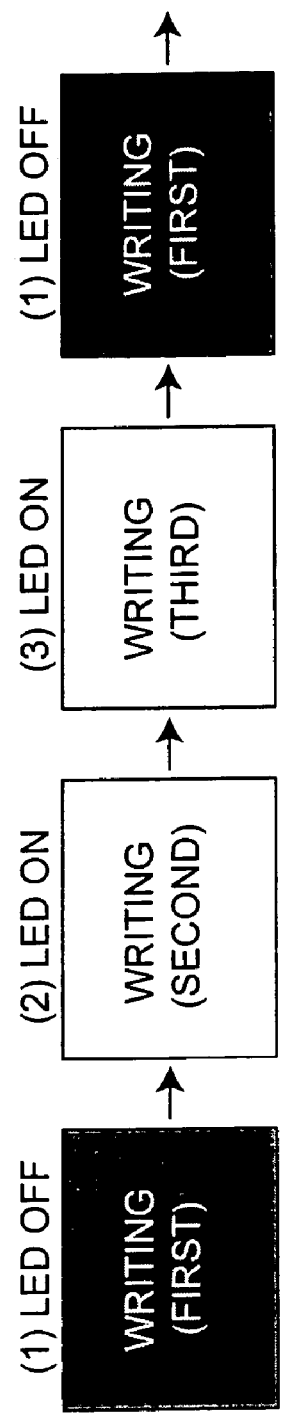
Figure 26C:
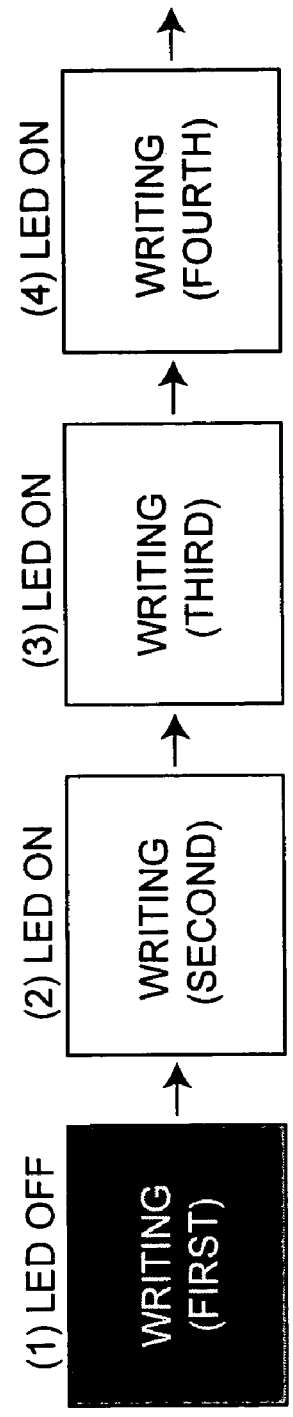

FIGS. 26A-26C are schematics illustrating operations of the front projection type multi-projection display according to the ninth exemplary embodiment. FIG. 26A shows a two-time speed driving liquid crystal device, FIG. 26B shows a three-time speed driving liquid crystal device, and FIG. 26C shows a four-time speed driving liquid crystal device.

According to the front projection type multi-projection display 900 of the ninth exemplary embodiment, as shown in FIG. 26, writing is performed twice or more to one unit screen information, and a liquid crystal device of a so-called n-time speed driving (here, n is a natural number of 2 or more) is used. Further, the solid-state light source is allowed to emit outside at least the first writing period of the liquid crystal device. Thus, it becomes possible to project intermittently the projection images onto the screen. For this reason, it is possible to alleviate the tailing phenomenon which is a defect of the hold type display. Further it is possible to perform moving picture display smoothly with satisfactory quality.

Further, in the first writing period, since the liquid crystal molecules do not yet sufficiently respond, it is not easy to raise contrast of the liquid crystal device. However, according to the front projection type multi-projection display 900 of the ninth exemplary embodiment, since the solid-state light source is allowed to emit outside the first writing period, in the liquid crystal device and the front projection type multi-projection display, it has an advantage that it is possible to further enhance contrast.

Tenth Exemplary Embodiment

Figure 27A:
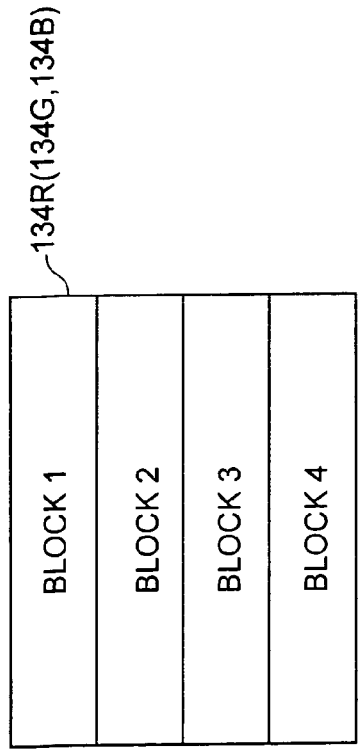
FIGS. 27A-27B are schematics illustrating operations of a front projection type multi-projection display according to a tenth exemplary embodiment.
Figure 27B:
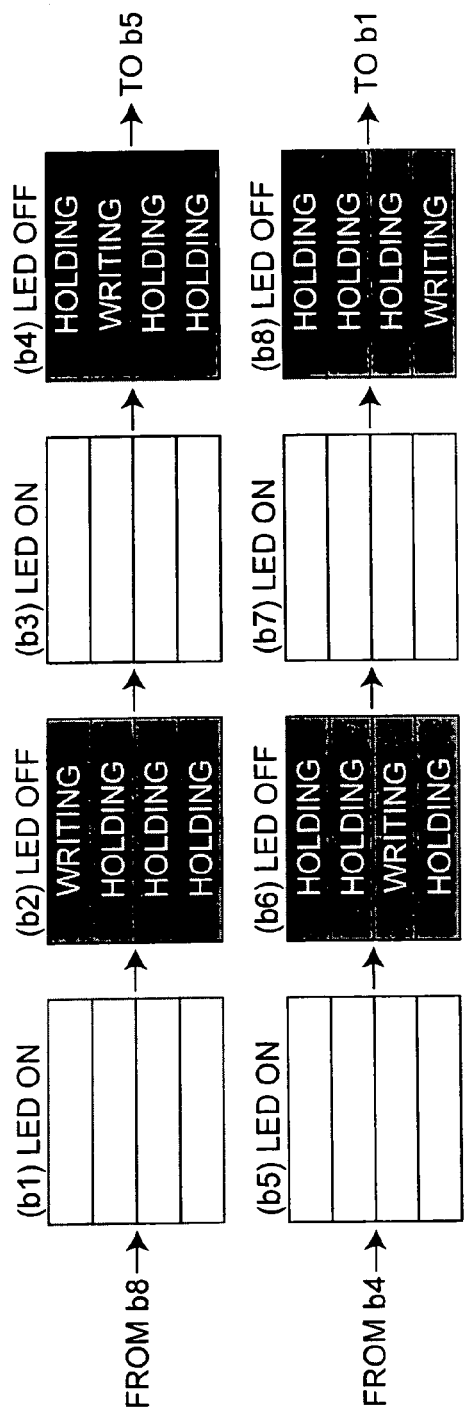

FIGS. 27A and 27B are schematics showing operations of a front projection type multi-projection display according to a tenth exemplary embodiment. The front projection type multi-projection display 1000 (not shown) according to the tenth exemplary embodiment includes the solid-state light source control unit 1080 (not shown) to control the amount of light emitted from the LED light sources for every projector unit or for every liquid crystal device 134R, 134G or 134B, similar to the front projection type multi-projection display 800 according to the eighth exemplary embodiment. Further, the solid-state light source control unit 1080 has a function of dynamically controlling the amount of light emitted from the LED light sources for every projector unit.

The front projection type multi-projection display 1000 according to the tenth exemplary embodiment includes the liquid crystal devices 134R, 134G, and 134B, which perform image writing sequentially for every screen region during one frame, as the liquid crystal device. Further, in the front projection type multi-projection display 1000 according to the tenth exemplary embodiment, the solid-state light source control unit 1080 has a function of allowing the LED light sources to emit during one frame outside the image writing periods of the liquid crystal devices 134R, 134G, and 134B.

For this reason, according to the front projection type multi-projection display 1000 of the tenth exemplary embodiment, the LED light sources are allowed to emit outside the image writing periods of the liquid crystal devices 134R, 134G, and 134B. Thus, it has an advantage that it is possible to further enhance contrast in the front projection type multi-projection display.

Eleventh Exemplary Embodiment

Figure 28:
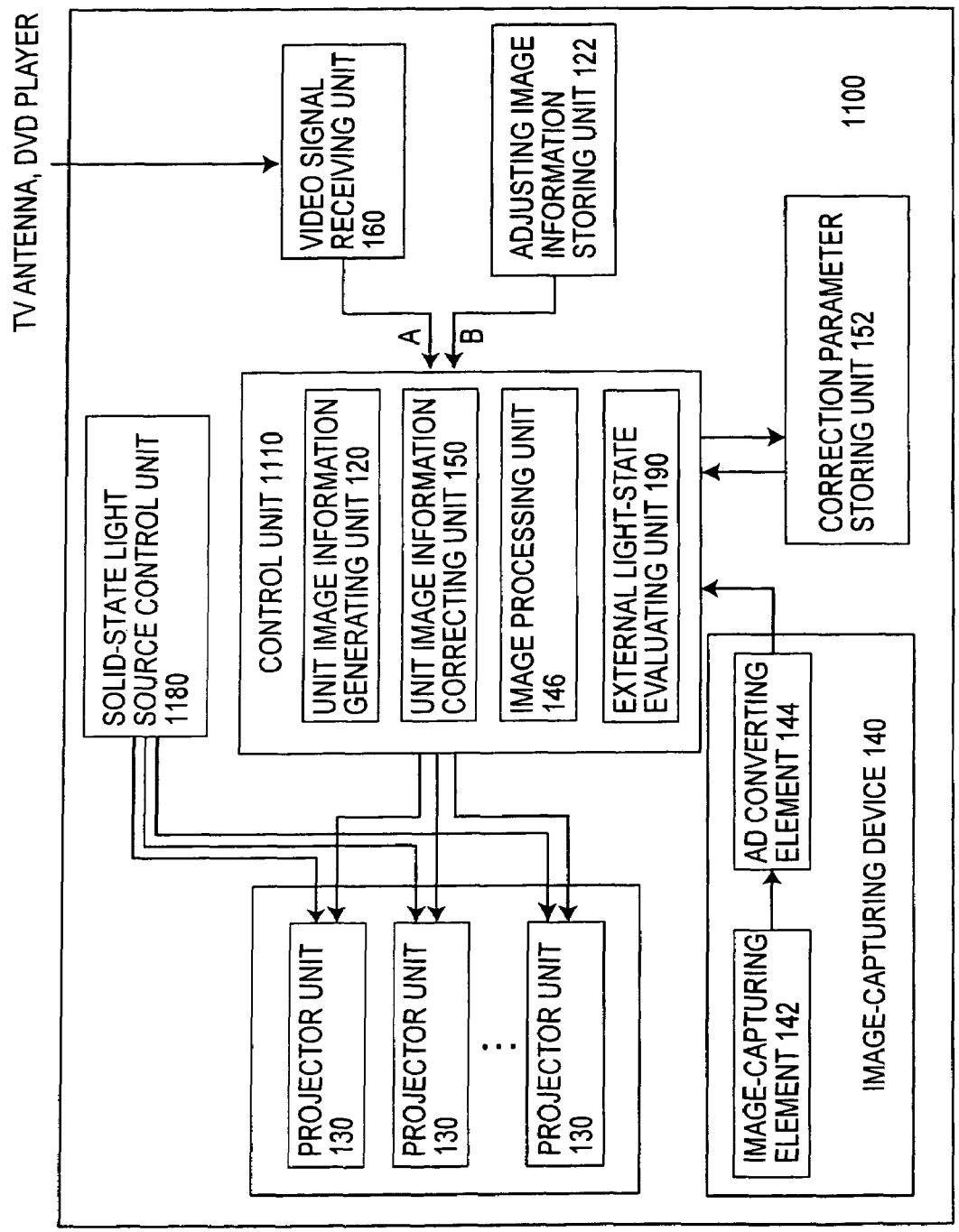
FIG. 28 is a schematic illustrating an outline of a front projection type multi-projection display according to an eleventh exemplary embodiment.

FIG. 28 is a schematic showing an outline of a front projection type multi-projection display according to an eleventh exemplary embodiment. The front projection type multi-projection display 1100 according to the eleventh exemplary embodiment may include an external light state evaluating unit 190 to evaluate a state of external light by capturing a screen in a state when the LED light source does not emit or weakly emits.

The solid-state light source control unit 1180 has a function of controlling the amount of light emitted from the LED light source taking a result evaluated by the external light state evaluating unit 190 into consideration.

Therefore, according to the front projection type multi-projection display 1100 according to the eleventh exemplary embodiment, in the presence of a strong external light, the amount of light emitted from the LED light source is correspondingly increased to lessen the effect of the external light during the image capturing process.

In the front projection type multi-projection display 1100 according to the eleventh exemplary embodiment, the external light state evaluating unit 190 in the control unit 1110 has a function of evaluating the state of the external light by capturing the screen based on an amount of light which is emitted from the light source at at least two emitting levels.

According to the front projection type multi-projection display 1100 according to the eleventh exemplary embodiment, the effect of the external light on the image quality is non-linear. Therefore, the state of the external light is evaluated by capturing the screen based on an amount of light which is emitted from the LED light source at at least two emitting levels to lessen the effect of the external light during the image capturing process.

What is claimed is:

1. A front projection type multi-projection display, comprising:
    a housing;
    a light source;
    a plurality of projector units, disposed in the housing, to modulate and project light from the light source based on image information;
    an image-capturing device, disposed in the housing, to capture predetermined regions of projection images projected onto a screen;
    a unit image information generating unit to generate image information to be input to each of the plurality of projector units;
    a unit image information correcting unit to correct the unit image information based on a result captured by the image-capturing device; and
    an external light state evaluating unit to evaluate a state of external light by capturing the screen in a state when the light source does not emit or weakly emits,
    the amount of light emitted from the light source being controlled based on an evaluation result by the external light state evaluating unit;
    the external light state evaluating unit using a function of evaluating the state of the external light by capturing the screen based on the amount of light which is emitted from the light source, the light from the light source being emitted at least at two emitting levels.

2. The front projection type multi-projection display according to claim 1,
    the image-capturing device changing a capturing range.

3. The front projection type multi-projection display according to claim 1,
    the image-capturing device having a plurality of image-capturing elements.

4. The front projection type multi-projection display according to claim 1,
    the image-capturing device capturing the entire screen.

5. The front projection type multi-projection display according to claim 1,
    the unit image information correcting unit correcting the shapes, positions and/or inclinations of unit images projected by the projector units.

6. The front projection type multi-projection display according to claim 1,
the unit image information correcting unit correcting the brightness and/or colors of the unit images projected by the projector units.

7. The front projection type multi projection display according to claim 1,
the unit image information correcting unit correcting the brightness and/or color for every pixel in the plurality of projector units.

8. The front projection type multi-projection display according to claim 1,
the unit image information correcting unit correcting the unit image information using correction parameters that are determined based on the captured result.

9. The front projection type multi-projection display according to claim 8, further comprising:
a correction parameter storing unit to store the correction parameters.

10. The front projection type multi-projection display according to claim 8, further comprising:
an automatic correction parameter acquiring device to automatically acquire the correction parameters by capturing an adjusting image at predetermined intervals.

11. The front projection type multi-projection display according to claim 1, further comprising:
an optical corrector to correct the position and/or orientation of an optical element provided in the front projection type multi-projection display.

12. The front projection type multi-projection display according to claim 11, further comprising:
an automatic optical element correcting device to automatically correct the position and/or orientation of the optical element by capturing the adjusting image at predetermined intervals.

13. The front projection type multi-projection display according to claim 1,
the external light state evaluating unit further having a function of automatically evaluating the state of the external light by capturing the screen at predetermined intervals.

14. The front projection type multi-projection display according to claim 1,
the light source being a solid-state light source.

15. The front projection type multi-projection display according to claim 14, further comprising:
a solid-state light source control unit to control the amount of light emitted from the solid-state light source separately for every projector unit.

16. A front projection type multi-projection display, comprising:
a housing;
a light source;
a plurality of projector units, disposed in the housing, to modulate and project light from the light source based on image information;
an image-capturing device, disposed in the housing, to capture predetermined regions of projection images projected onto a screen;
a unit image information generating unit to generate image information to be input to each of the plurality of projector units;
a unit image information correcting unit to correct the unit image information based on a result captured by the image-capturing device;
an optical corrector to correct the position and/or orientation of an optical element provided in the front projection type multi-projection display; and
an automatic optical element correcting device to automatically correct the position and/or orientation of the optical element by capturing an adjusting image at predetermined intervals.

17. A front projection type multi-projection display, comprising:
a housing;
a light source;
a plurality of projector units, disposed in the housing, to modulate and project light from the light source based on image information;
an image-capturing device, disposed in the housing, to capture predetermined regions of projection images projected onto a screen;
a unit image information generating unit to generate image information to be input to each of the plurality of projector units;
a unit image information correcting unit to correct the unit image information based on a result captured by the image-capturing device;
an external light state evaluating unit to evaluate a state of external light by capturing the screen in a state when the light source does not emit or weakly emits,
the amount of light emitted from the light source being controlled based on an evaluation result by the external light state evaluating unit,
the external light state evaluating unit further having a function of automatically evaluating the state of the external light by capturing the screen at predetermined intervals.

* * * * *